(12) United States Patent
Xue et al.

(10) Patent No.: US 12,114,186 B2
(45) Date of Patent: Oct. 8, 2024

(54) CHANNEL MONITORING METHOD AND DEVICE

(71) Applicant: Huawei Technologies Co., Ltd., Shenzhen (CN)

(72) Inventors: Lixia Xue, Beijing (CN); Zheng Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 568 days.

(21) Appl. No.: 17/372,293

(22) Filed: Jul. 9, 2021

(65) Prior Publication Data
US 2021/0337409 A1    Oct. 28, 2021

Related U.S. Application Data

(63) Continuation of application No. PCT/CN2020/070323, filed on Jan. 3, 2020.

(30) Foreign Application Priority Data

Jan. 11, 2019    (CN) .......................... 201910028855.8

(51) Int. Cl.
*H04W 52/02* (2009.01)
*H04W 24/08* (2009.01)
(Continued)

(52) U.S. Cl.
CPC ........... *H04W 24/08* (2013.01); *H04W 76/28* (2018.02)

(58) Field of Classification Search
CPC . H04W 24/08; H04W 76/28; H04W 52/0235; H04W 52/0212; H04W 52/0248
See application file for complete search history.

(56) References Cited

U.S. PATENT DOCUMENTS 8,929,319 B2 * 1/2015 Anderson ........... H04W 74/006
    370/329
10,212,755 B1 * 2/2019 Pawar ................. H04W 72/541
(Continued)

FOREIGN PATENT DOCUMENTS

CN    102595573 A    7/2012
CN    103200653 A    7/2013
(Continued)

OTHER PUBLICATIONS

3GPP TSG-RAN2 Meeting#106, R2-1906604 Title: Efficient transition to Idle andInactive mode (Year: 2019).*

(Continued)

*Primary Examiner* — Faruk Hamza
*Assistant Examiner* — Abusayeed M Haque
(74) *Attorney, Agent, or Firm* — Leydig, Voit & Mayer, Ltd.

(57) ABSTRACT

A channel monitoring method and a device are described. The method includes: monitoring, by a terminal device, a first signal on n transmission occasions in a monitoring periodicity; and when the terminal device detects the first signal on at least one of the n transmission occasions, monitoring, by the terminal device, a downlink control channel and/or a second signal in a first time period in the monitoring periodicity; or when the terminal device does not detect the first signal on the n transmission occasions, skipping, by the terminal device, monitoring a downlink control channel in the monitoring periodicity.

10 Claims, 12 Drawing Sheets

(51) Int. Cl.
*H04W 68/00* (2009.01)
*H04W 76/28* (2018.01)

(56) References Cited

U.S. PATENT DOCUMENTS

| | | |
|---|---|---|
| 2014/0050100 A1 | 2/2014 | Liu et al. |
| 2015/0092647 A1* | 4/2015 | Tabet ................ H04W 28/0221 370/311 |
| 2015/0351153 A1* | 12/2015 | Ramkumar ........... H04L 1/1861 370/329 |
| 2017/0280473 A1* | 9/2017 | Krishnamoorthy ........................... H04W 72/542 |
| 2018/0092085 A1* | 3/2018 | Shaheen ............... H04W 36/14 |
| 2019/0103953 A1* | 4/2019 | Liao ...................... H04W 72/23 |
| 2020/0413341 A1 | 12/2020 | Xu et al. |

FOREIGN PATENT DOCUMENTS

| | | | |
|---|---|---|---|
| CN | 108235412 A | 6/2018 | |
| WO | WO-2017171922 A1 * | 10/2017 | |
| WO | WO-2019007389 A1 * | 1/2019 | .......... H04J 13/0029 |

OTHER PUBLICATIONS

3GPP TSG-RAN WG2#114-e, R2-2104836 Title:Lft issues on SL DRX RTT timer (Year: 2021).*

"UE behaviour on DRX timer operation," 3GPP TSG-RAN2 #101, R2-1801758 resubmission of R2-1800073, Athens, Greece, pp. 1-7, 3rd Generation Partnership Project, Valbonne, France (Feb. 26-Mar. 2, 2018).

Ericsson, "DRX with short onDuration and Wake-up signaling," 3GPP TSG RAN WG2 #101, Athens, Greece, R2-1803189, Update of R2-1800332, Total 3 pages, 3rd Generation Partnership Project, Valbonne, France (Feb. 26-Mar. 2, 2018).

* cited by examiner

CHANNEL MONITORING METHOD AND DEVICE

CROSS-REFERENCE TO RELATED APPLICATIONS

This application is a continuation of International Application No. PCT/CN2020/070323, filed on Jan. 3, 2020, which claims priority to Chinese Patent Application No. 201910028855.8, filed on Jan. 11, 2019. The disclosures of the aforementioned applications are hereby incorporated by reference in their entireties.

TECHNICAL FIELD

This application relates to the field of communication technologies, and in particular, to a channel monitoring method and a device.

BACKGROUND

Currently, a base station transmits a physical downlink shared channel (PDSCH) to a terminal device. However, a PDSCH is usually scheduled by using control information carried on a physical downlink control channel (PDCCH), and the control information is, for example, downlink control information (DCI). Therefore, to correctly receive the PDSCH, the terminal device needs to first monitor the PDCCH, and obtain, based on the DCI carried on the PDCCH, related information required for receiving the PDSCH, for example, a location and a size of a time-frequency resource of the PDSCH, or multi-antenna configuration information.

Generally, a packet-based data stream is usually bursty. There is data transmission in a time period, but there may be no data transmission in a following relatively long time period. If the terminal device continuously monitors the PDCCH, useless work may be performed in a very long time, and power consumption of the terminal device is relatively high.

SUMMARY

Embodiments of this application provide a channel monitoring method and a device, to reduce power consumption of a terminal device.

According to a first aspect, a first channel monitoring method is provided, where the method includes: A terminal device monitors a first signal on n transmission occasions in a monitoring periodicity, where n is a positive integer. When the terminal device detects the first signal on at least one of the n transmission occasions, the terminal device monitors a downlink control channel and/or a second signal in a first time period in the monitoring periodicity; or when the terminal device does not detect the first signal on the n transmission occasions, the terminal device skips monitoring a downlink control channel in the monitoring periodicity.

The method may be performed by a first communication apparatus. The first communication apparatus may be the terminal device or a communication apparatus that can support the terminal device in implementing a function required by the method. Certainly, the first communication apparatus may alternatively be another communication apparatus, for example, a chip system. Herein, an example in which the first communication apparatus is the terminal device is used.

In this embodiment of this application, if the network device has data to be scheduled, the network device may send the first signal. If the network device does not schedule data in a period of time after the n transmission occasions, the network device may not send the first signal, and then the terminal device does not detect the first signal on the n transmission occasions. In this case, the terminal device may not monitor the downlink control channel in a second time period, so that a probability that the terminal device performs useless work is reduced, and power consumption of the terminal device is also reduced.

With reference to the first aspect, in a possible implementation of the first aspect, timing for the first time period is performed by using a first timer, and timing duration of the first timer is a length of the first time period.

The terminal device may perform timing for the first time period by using the first timer, so that start and end locations of the first time period can be defined.

With reference to the first aspect, in a possible implementation of the first aspect, if the terminal device monitors the downlink control channel and the second signal in the first time period in the monitoring periodicity, the method further includes: When the terminal device detects the second signal in the timing duration of the first timer, the terminal device resets the first timer, and monitors the downlink control channel in timing duration of the reset first timer; or when the terminal device detects the second signal in the timing duration of the first timer and the second signal indicates to continue monitoring the downlink control channel, the terminal device resets the first timer, and monitors the downlink control channel in timing duration of the reset first timer.

If the terminal device detects the second signal in the timing duration of the first timer, it indicates that the network device may subsequently send the downlink control channel. Therefore, the terminal device may monitor the downlink control channel, and the terminal device may further reset the first timer based on the second signal. For example, the network device may send a relatively large amount of data, through the resetting of the first timer, the terminal device is enabled to receive the downlink control channel in relatively plenty of time, and it is ensured as much as possible that the terminal device can receive the complete data. The second signal may be implemented in different manners. The second signal may be used as an energy saving signal through the second signal itself. In this case, the terminal device may determine, based on whether the second signal is received, how to perform processing. Content carried in the second signal is not limited, and implementation is relatively simple. Alternatively, the second signal may perform different indication by using content carried in the second signal. After receiving the second signal, the terminal device needs to determine specific indication content of the second signal, to determine an operation in a next step. In this manner, the indication of the second signal can be clearer.

With reference to the first aspect, in a possible implementation of the first aspect, if the terminal device monitors the downlink control channel and the second signal in the first time period in the monitoring periodicity, the method further includes: when the terminal device has not detected the second signal in the timing duration of the first timer, monitoring the downlink control channel.

Because the network device may send both the downlink control channel and the second signal, the terminal device may monitor the downlink control channel even if the terminal device does not detect the second signal, thereby ensuring timely reception of the downlink control channel as much as possible.

With reference to the first aspect, in a possible implementation of the first aspect, if the terminal device monitors the second signal in the first time period in the monitoring periodicity, the method further includes: When the terminal device detects the second signal in the timing duration of the first timer, the terminal device resets the first timer, and monitors the downlink control channel in timing duration of the reset first timer; or when the terminal device detects the second signal in the timing duration of the first timer and the second signal indicates to monitor the downlink control channel, the terminal device resets the first timer, and monitors the downlink control channel in timing duration of the reset first timer.

If the terminal device detects the second signal in the timing duration of the first timer, it indicates that the network device may subsequently send the downlink control channel. Therefore, the terminal device may monitor the downlink control channel, and the terminal device may further reset the first timer based on the second signal. For example, the network device may send a relatively large amount of data, through the resetting of the first timer, the terminal device is enabled to receive the downlink control channel in relatively plenty of time, and it is ensured as much as possible that the terminal device can receive the complete data. The second signal may be implemented in different manners. The second signal may be used as an energy saving signal through the second signal itself. In this case, the terminal device may determine, based on whether the second signal is received, how to perform processing. Content carried in the second signal is not limited, and implementation is relatively simple. Alternatively, the second signal may perform different indication by using content carried in the second signal. After receiving the second signal, the terminal device needs to determine specific indication content of the second signal, to determine an operation in a next step. In this manner, the indication of the second signal can be clearer.

With reference to the first aspect, in a possible implementation of the first aspect, if the terminal device monitors the second signal in the first time period in the monitoring periodicity, the method further includes: when the terminal device has not detected the second signal in the timing duration of the first timer, skipping monitoring the downlink control channel.

In this case, the network device sends the downlink control channel after sending the second signal. Therefore, if the terminal device does not detect the second signal, the terminal device does not need to monitor the downlink control channel. In this way, the power consumption of the terminal device can be reduced.

With reference to the first aspect, in a possible implementation of the first aspect, the method further includes: When the terminal device detects the second signal in the timing duration of the first timer and the second signal indicates to suspend monitoring the downlink control channel, the terminal device suspends monitoring the downlink control channel in a third time period.

If the second signal indicates to suspend monitoring the downlink control channel, it indicates that the network device may not send the downlink control channel in a future period of time. In this case, for example, the terminal device enters a "sleep" state in the third time period, and in the third time period, the terminal device may suspend monitoring the downlink control channel, or may suspend monitoring second signal, to reduce the power consumption.

With reference to the first aspect, in a possible implementation of the first aspect, the method further includes: when the terminal device detects the second signal in the timing duration of the first timer and the second signal indicates to suspend monitoring the downlink control channel, keeping the first timer running.

If the second signal indicates to suspend monitoring the downlink control channel, although the terminal device suspends monitoring the downlink control channel, the terminal device may still keep the first timer running, to continue to perform timing.

With reference to the first aspect, in a possible implementation of the first aspect, the method further includes: When the first timer expires, the terminal device stops monitoring the downlink control channel and the second signal.

When the first timer expires, the network device no longer sends the downlink control channel and the second signal. For example, a data sending process may have been completed. In this case, the terminal device may also stop monitoring the downlink control channel and the second signal, to reduce the power consumption.

With reference to the first aspect, in a possible implementation of the first aspect, when the first timer runs, the terminal device skips monitoring the first signal.

When the first timer runs, the network device may further send the first signal. For example, the first signal is a UE-group specific signal. In this case, to meet a requirement of a group of terminal devices, the network device may continuously send the first signal. In this case, the terminal device whose first timer has started to run may no longer monitor the first signal, to normally complete another monitoring process.

With reference to the first aspect, in a possible implementation of the first aspect, the terminal device periodically monitors the second signal in the timing duration of the first timer.

The network device may periodically send the second signal, and the terminal device may also periodically monitor the second signal. For example, a monitoring periodicity of the terminal device for the second signal may be less than or equal to a monitoring periodicity of the terminal device for the first signal. Certainly, the monitoring periodicity of the terminal device for the second signal may be greater than the monitoring periodicity of the terminal device for the first signal. This is not specifically limited.

With reference to the first aspect, in a possible implementation of the first aspect, the first signal is used to indicate duration of the first time period.

For example, the duration of the first time period may be indicated by using the first signal. In this case, after receiving the first signal, the terminal device may determine the duration of the first time period. Alternatively, the terminal device may determine the duration of the first time period in another manner, for example, in a manner specified in a protocol. This is not specifically limited.

With reference to the first aspect, in a possible implementation of the first aspect, the n transmission occasions are n consecutive transmission occasions.

For example, the n transmission occasions may be consecutive, so as to facilitate monitoring by the terminal device. Alternatively, every two of the n transmission occasions may be inconsecutive. Alternatively, some of the n transmission occasions may be consecutive, but the some of the transmission occasions are inconsecutive with the remaining transmission occasions. This is not specifically limited.

With reference to the first aspect, in a possible implementation of the first aspect, the first signal is generated based on a first sequence, the second signal is generated based on a second sequence, the first sequence belongs to a first sequence set, the second sequence belongs to a second sequence set, and the first sequence set is a subset of the second sequence set; or the first signal carries a first status value, the second signal carries a second status value, the first status value belongs to a first status value set, the second information status value belongs to a second status value set, and the first status value set is a subset of the second status value set.

In this embodiment of this application, the first signal and the second signal may be generated based on a sequence, or may not be generated based on a sequence. For example, the first signal and the second signal are in a form of signaling, to be specific, a bit in an information field is transmitted after channel coding is performed on the bit. Certainly, there may be another generation manner. This is relatively flexible.

With reference to the first aspect, in a possible implementation of the first aspect, the monitoring periodicity is a DRX cycle, the start location of the first time period is a start location of a DRX cycle, and the terminal device starts only the first timer in the first time period.

In an implementation, the first signal may be combined with a DRX mechanism. In this case, in this embodiment of this application, the time start location of the first time period may be a time start location of a DRX cycle, and the periodicity in which the terminal device monitors the first signal may directly be a DRX cycle. In this case, timing duration of an on duration timer of the DRX cycle is 0 ms, and in an active time of the DRX cycle, the terminal device starts only the first timer at the start location of the DRX cycle. In this case, it is considered that no inactivity timer exists. Alternatively, in this case, in an active time of the DRX cycle, the terminal device starts only the first timer at the start location of the DRX cycle. In this case, it is considered that neither an on duration timer nor an inactivity timer exists. Alternatively, the first timer may be an inactivity timer. The inactivity timer is started at the start location of the DRX cycle, or the inactivity timer is started provided that the terminal device detects the first signal. In this case, no on duration time exists. A running time of the first timer may be the active time of the DRX cycle. In this embodiment of this application, one timer (the first timer) is used to replace original two timers in the DRX cycle. Compared with an existing solution, the solution in this embodiment of this application is simpler.

According to a second aspect, a second channel monitoring method is provided, where the method includes: A network device determines to perform data scheduling on a terminal device in a monitoring periodicity. The network device sends a first signal on n transmission occasions in the monitoring periodicity, where the first signal is used to indicate data scheduling, and n is a positive integer.

The method may be performed by a second communication apparatus. The second communication apparatus may be a network device or a communication apparatus that can support a network device in implementing functions required in the method. Certainly, the second communication apparatus may alternatively be another communication apparatus, for example, a chip system. Herein, an example in which the second communication apparatus is the network device is used.

With reference to the second aspect, in a possible implementation of the second aspect, the method further includes: The network device sends a downlink control channel and/or a second signal in a first time period in the monitoring periodicity.

With reference to the second aspect, in a possible implementation of the second aspect, timing for the first time period is performed by using a first timer, and timing duration of the first timer is a length of the first time period.

With reference to the second aspect, in a possible implementation of the second aspect, if the network device sends the downlink control channel and the second signal in the first time period in the monitoring periodicity, the method further includes: When the network device sends the second signal in the timing duration of the first timer, the network device resets the first timer, and sends the downlink control channel in timing duration of the reset first timer; or when the network device sends the second signal in the timing duration of the first timer and the second signal indicates to continue monitoring the downlink control channel, the network device resets the first timer, and sends the downlink control channel in timing duration of the reset first timer.

With reference to the second aspect, in a possible implementation of the second aspect, if the network device sends the downlink control channel and the second signal in the first time period in the monitoring periodicity, the method further includes: when the network device has not sent the second signal in the timing duration of the first timer, sending the downlink control channel.

With reference to the second aspect, in a possible implementation of the second aspect, if the network device sends the second signal in the first time period in the monitoring periodicity, the method further includes: When the network device sends the second signal in the timing duration of the first timer, the network device resets the first timer, and sends the downlink control channel in timing duration of the reset first timer; or when the network device sends the second signal in the timing duration of the first timer and the second signal indicates to monitor the downlink control channel, the network device resets the first timer, and sends the downlink control channel in timing duration of the reset first timer.

With reference to the second aspect, in a possible implementation of the second aspect, if the network device sends the second signal in the first time period in the monitoring periodicity, the method further includes: when the network device has not sent the second signal in the timing duration of the first timer, skipping sending the downlink control channel.

With reference to the second aspect, in a possible implementation of the second aspect, the method further includes: When the network device sends the second signal in the timing duration of the first timer and the second signal indicates to suspend monitoring the downlink control channel, the network device suspends sending the downlink control channel in a third time period.

With reference to the second aspect, in a possible implementation of the second aspect, the method further includes: when the network device sends the second signal in the timing duration of the first timer and the second signal indicates to suspend monitoring the downlink control channel, keeping the first timer running.

With reference to the second aspect, in a possible implementation of the second aspect, the method further includes: When the first timer expires, the network device stops sending the downlink control channel and the second signal.

With reference to the second aspect, in a possible implementation of the second aspect, when the first timer runs, the network device skips sending the first signal.

With reference to the second aspect, in a possible implementation of the second aspect, the network device periodically sends the second signal in the timing duration of the first timer.

With reference to the second aspect, in a possible implementation of the second aspect, the first signal is used to indicate duration of the first time period.

With reference to the second aspect, in a possible implementation of the second aspect, the n transmission occasions are n consecutive transmission occasions.

With reference to the second aspect, in a possible implementation of the second aspect, the first signal is generated based on a first sequence, the second signal is generated based on a second sequence, the first sequence belongs to a first sequence set, the second sequence belongs to a second sequence set, and the first sequence set is a subset of the second sequence set; or the first signal carries a first status value, the second signal carries a second status value, the first status value belongs to a first status value set, the second information status value belongs to a second status value set, and the first status value set is a subset of the second status value set.

With reference to the second aspect, in a possible implementation of the second aspect, the monitoring periodicity is a DRX cycle, the start location of the first time period is a start location of a DRX cycle, and the network device starts only the first timer in the first time period.

For technical effects achieved by the second aspect or the possible implementations of the second aspect, refer to the descriptions of the technical effects of the first aspect or the possible implementations of the first aspect.

According to a third aspect, a first type of communication apparatus is provided. The communication apparatus may be a terminal device, or may be a chip in a terminal device. The apparatus may include a processing unit and a transceiver unit. When the apparatus is a terminal device, the processing unit may be a processor, and the transceiver unit may be a transceiver. The terminal device may further include a storage unit, and the storage unit may be a memory. The storage unit is configured to store instructions, and the processing unit executes the instructions stored in the storage unit, so that the terminal device performs corresponding functions in the first aspect. When the apparatus is a chip in a terminal device, the processing unit may be a processor, the transceiver unit may be an input/output interface, a pin, a circuit, or the like. The processing unit executes instructions stored in a storage unit, so that the terminal device performs corresponding functions in the first aspect. The storage unit may be a storage unit (e.g., a register or a cache) in the chip, or may be a storage unit (e.g., a read-only memory or a random access memory) that is outside the chip and that is in the terminal device.

According to a fourth aspect, a second type of communication apparatus is provided. The communication apparatus may be a network device, or may be a chip in a network device. The apparatus may include a processing unit and a transceiver unit. When the apparatus is a network device, the processing unit may be a processor, and the transceiver unit may be a transceiver. The network device may further include a storage unit, and the storage unit may be a memory. The storage unit is configured to store instructions, and the processing unit executes the instructions stored in the storage unit, so that the network device performs corresponding functions in the first aspect. When the apparatus is a chip in a network device, the processing unit may be a processor, the transceiver unit may be an input/output interface, a pin, a circuit, or the like. The processing unit executes instructions stored in a storage unit, so that the network device performs corresponding functions in the first aspect. The storage unit may be a storage unit (e.g., a register or a cache) in the chip, or may be a storage unit (e.g., a read-only memory or a random access memory) that is outside the chip and that is in the network device.

According to a fifth aspect, a communication system is provided. The communication system may include the first type of communication apparatus according to the third aspect, the third type of communication apparatus according to the fifth aspect, or the fifth type of communication apparatus according to the seventh aspect, and include the second type of communication apparatus according to the fourth aspect, the fourth type of communication apparatus according to the sixth aspect, or the sixth type of communication apparatus according to the eighth aspect.

According to a sixth aspect, a computer storage medium is provided. The computer-readable storage medium stores instructions, and when the instructions are run on a computer, the computer is enabled to perform the method according to any one of the first aspect or the possible designs of the first aspect.

According to a seventh aspect, a computer storage medium is provided. The computer-readable storage medium stores instructions, and when the instructions are run on a computer, the computer is enabled to perform the method according to any one of the second aspect or the possible designs of the second aspect.

According to an eighth aspect, a computer program product including instructions is provided. The computer program product stores the instructions, and when the instructions are run on a computer, the computer is enabled to perform the method according to any one of the first aspect or the possible designs of the first aspect.

According to a ninth aspect, a computer program product including instructions is provided. The computer program product stores the instructions, and when the instructions are run on a computer, the computer is enabled to perform the method according to any one of the second aspect or the possible designs of the second aspect.

In the embodiments of this application, if the network device does not schedule the data in the period of time after the n transmission occasions, the network device may not send the first signal, and then the terminal device does not detect the first signal on the n transmission occasions. In this case, the terminal device may not monitor the downlink control channel in the second time period, so that the probability that the terminal device performs useless work is reduced, and the power consumption of the terminal device is also reduced.

DESCRIPTION OF EMBODIMENTS

Figure 1:
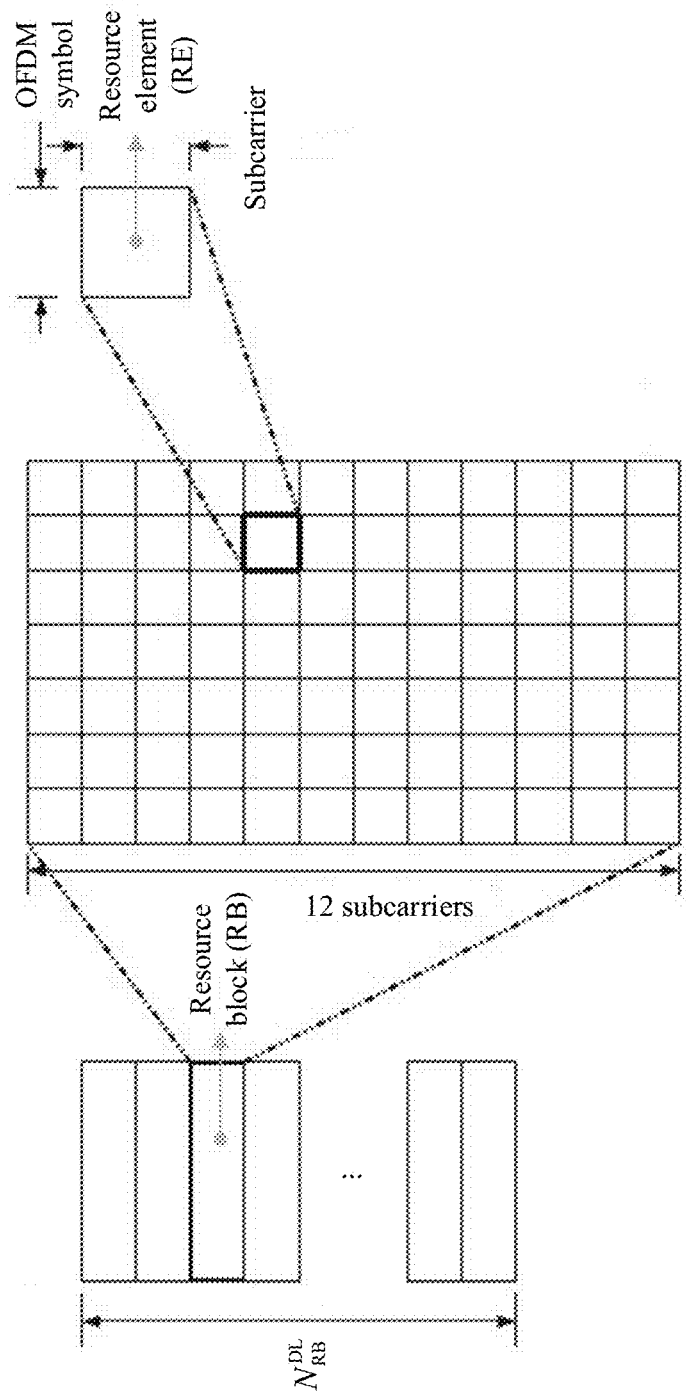
FIG. 1 is a schematic diagram of a downlink time-frequency resource grid.

To make the objectives, the technical solutions, and advantages of the embodiments of this application clearer, the following further describes the embodiments of this application in detail with reference to the accompanying drawings.

In the following descriptions, some terms in the embodiments of this application are described, to help a person skilled in the art have a better understanding.

(1) A terminal device includes a device that provides a user with voice and/or data connectivity, for example, may include a handheld device having a wireless connection function, or a processing device connected to a wireless modem. The terminal device may communicate with a core network through a radio access network (RAN) and exchange voice and/or data with the RAN. The terminal device may include user equipment (UE), a wireless terminal device, a mobile terminal device, a device-to-device communication (D2D) terminal device, a V2X terminal device, a machine-to-machine/machine-type communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus, or the like. For example, the terminal is a personal communications service (PCS) phone, a cordless telephone set, a session initiation protocol (SIP) phone, a wireless local loop (WLL) station, or a personal digital assistant (PDA). The terminal further includes a limited device such as a device with relatively low power consumption, a device with a limited storage capability, or a device with a limited computing capability. For example, the terminal includes an information sensing device such as a barcode, radio frequency identification (RFID), a sensor, a global positioning system (GPS), or a laser scanner.

By way of example rather than limitation, in the embodiments of this application, the terminal device may alternatively be a wearable device. The wearable device may also be referred to as a wearable intelligent device, an intelligent wearable device, or the like, and is a generic term for wearable devices that are developed by applying wearable technologies to intelligently designs of daily wear, such as glasses, gloves, watches, clothes, and shoes. The wearable device is a portable device that can be directly worn on a body or integrated into clothes or an accessory of a user. The wearable device is not only a hardware device, but implements powerful functions through software support, data exchange, and cloud interaction. Generalized wearable intelligent devices include full-featured and large-size devices, such as smart watches or smart glasses, that can implement complete or partial functions without depending on smartphones; and devices, such as various smart bands, smart helmets, or smart jewelry for monitoring physical signs, that focus on only one type of application function and need to work with other devices such as smartphones.

However, if the various terminal devices described above are located in a vehicle (e.g., placed in the vehicle or mounted in the vehicle), the terminal devices may be considered as vehicle-mounted terminal devices. For example, the vehicle-mounted terminal devices are also referred to as on-board units (OBU).

(2) A network device includes, for example, an access network (AN) device such as a base station (e.g., an access point), and may be a device that communicates with a wireless terminal device over an air interface through one or more cells in an access network. Alternatively, for example, a network device in a V2X technology is a road side unit (RSU). The base station may be configured to mutually convert a received over-the-air frame and a received internet protocol (IP) packet, and serve as a router between the terminal device and the other parts of the access network, where the other parts of the access network may include an IP network. The RSU may be a fixed infrastructure entity supporting application of the V2X, and may exchange a message with another entity supporting application of the V2X. The network device may further coordinate attribute management of the air interface. For example, the network device may include an evolved NodeB (NodeB, eNB, e-NodeB, or evolutional Node B) in an LTE system or long term evolution-advanced (LTE-A), may include a next generation NodeB (gNB) in a 5th generation (the 5th generation, 5G) new radio (NR) system, or may include a centralized unit (CU) and a distributed unit (DU) in a cloud access network (cloud RAN) system. This is not limited in the embodiments of this application.

(3) A downlink control channel may be, for example, a PDCCH, an enhanced physical downlink control channel (PDCCH), or another downlink control channel. This is not specifically limited.

(4) The terms "system" and "network" may be used interchangeably in the embodiments of this application. "At least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" generally represents an "or" relationship between the associated objects. "At least one item (piece) of the following" or a similar expression thereof means any combination of these items, including a singular item (piece) or any combination of plural items (pieces). For example, at least one item (piece) of a, b, or c may represent a, b, c, a and b, a and c, b and c, or a, b, and c, where a, b, and c may be singular or plural.

In addition, unless otherwise stated, ordinal numbers such as "first" and "second" in the embodiments of this application are used to distinguish between a plurality of objects, but are not intended to limit a sequence, a time sequence, priorities, or importance degrees of the plurality of objects. For example, a first signal and a second signal are merely intended to distinguish between different signals, but do not represent a difference between the two types of signals in content, priority, sending sequence, importance, or the like.

The foregoing describes some concepts in the embodiments of this application. The following describes technical features in the embodiments of this application.

In the NR system, a basic unit in frequency domain is a subcarrier, and a subcarrier spacing (SCS) may be 15 KHz, 30 KHz, or the like. At a physical layer of the NR system, a unit of an uplink/downlink frequency domain resource is a physical resource block (PRB), and each PRB includes 12 consecutive subcarriers in frequency domain. FIG. 1 shows a downlink time-frequency resource grid. In FIG. 1, $N_{RB}^{DL}$ represents a quantity of resource blocks (RB) for one time of downlink scheduling. One RB includes 12 consecutive subcarriers in frequency domain. Each element in the resource grid is referred to as one resource element (RE), and the RE is a minimum physical resource, and includes one subcarrier in one orthogonal frequency division multiplexing (OFDM) symbol. An uplink time-frequency resource grid is similar to the downlink time-frequency resource grid. In the NR system, a basic time unit for downlink resource scheduling is a slot. Generally, one slot includes 14 OFDM symbols in terms of time.

Currently, a base station transmits a PDSCH to a terminal device, and the PDSCH is usually scheduled by using control information carried in a PDCCH. The control information is, for example, DCI. Therefore, to correctly receive the PDSCH, the terminal device needs to first monitor the PDCCH, and obtain, based on the DCI carried on the PDCCH, related information required for receiving the PDSCH, for example, a location and a size of a time-frequency resource of the PDSCH, or multi-antenna configuration information. The PDCCH is transmitted in a control-resource set (CORESET). The CORESET includes a plurality of PRBs in frequency domain, and includes one to three OFDM symbols in time domain, and these OFDM symbols may be located at any location in a slot.

Figure 2:
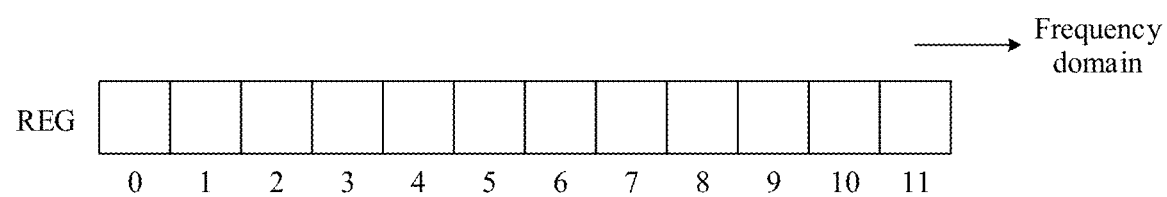
FIG. 2 is a schematic diagram of one REG.

A control channel element (CCE) is a basic unit for forming a PDCCH, and each CCE in a CORESET has one corresponding index number. A given PDCCH may include one, two, four, eight, or 16 CCEs, and a quantity of CCEs included in the PDCCH may be determined by a DCI payload size and a required coding rate. The quantity of CCEs included the PDCCH is also referred to as an aggregation level (AL). The base station may adjust the aggregation level of the PDCCH based on a status of an actually transmitted radio channel, to implement link adaptation transmission. The CCE is a logical concept. Therefore, one CCE corresponds to six resource-element groups (REGs) on a physical resource. One REG occupies one OFDM symbol in time domain, and occupies one RB in frequency domain. For this, refer to FIG. 2.

A search space is a set of PDCCH candidates at an aggregation level. An aggregation level of a PDCCH actually sent by the base station may vary with time, and because no related signaling is used to notify the terminal device, the terminal device needs to blindly monitor the PDCCH at different aggregation levels. A PDCCH to be blindly monitored is referred to as a PDCCH candidate, and there may be a plurality of PDCCH candidates at an aggregation level.

Figure 3:
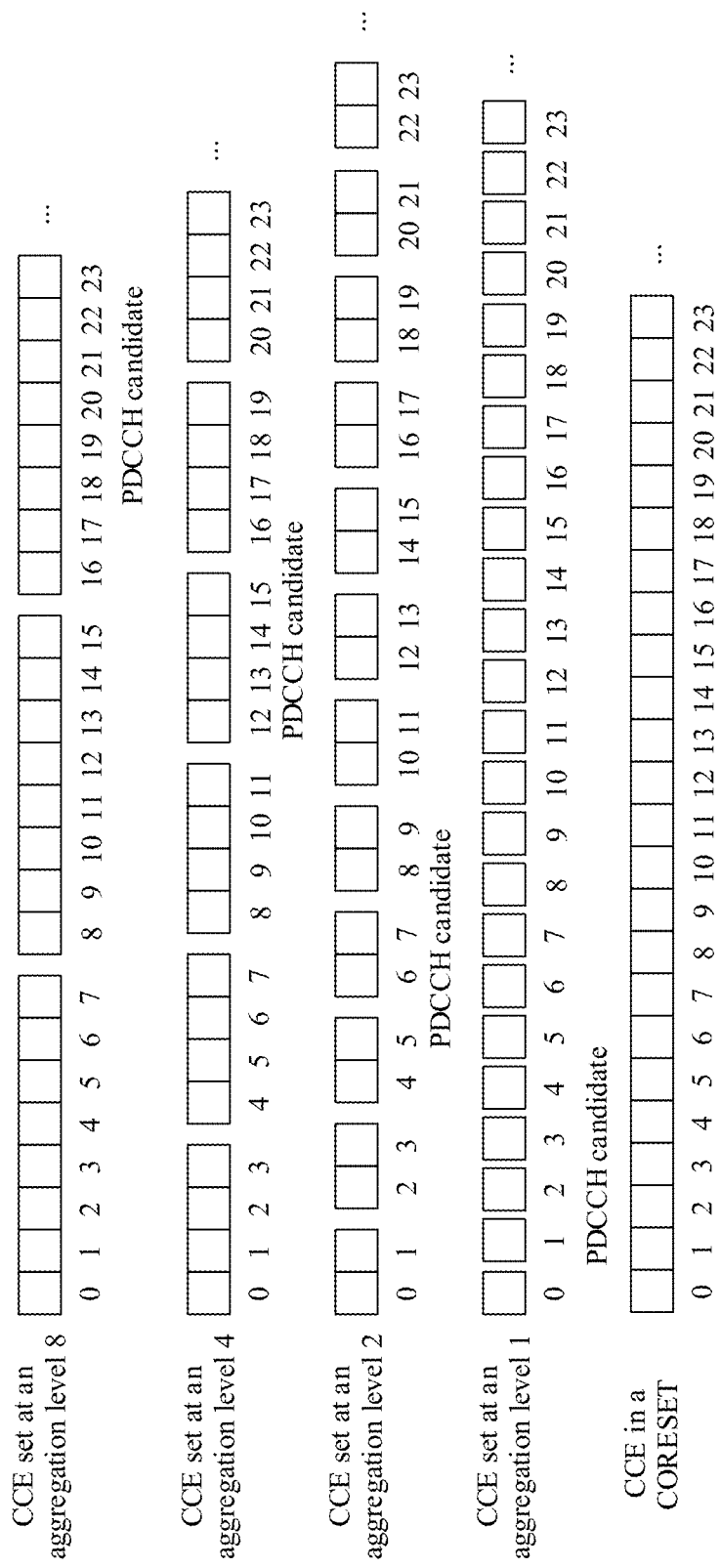
FIG. 3 is a schematic diagram of a search space.

FIG. 3 is a schematic diagram of a search space. The terminal device decodes, in the search space, all PDCCH candidates including CCEs. If cyclic redundancy check (CRC) check succeeds, it is considered that content of a decoded PDCCH is valid for the terminal device, and the terminal device may continue to process decoded related information.

In the NR system, to better control complexity of blindly monitoring a downlink control channel, the base station may configure one or more search space sets for the terminal device. Each search space set includes a search space corresponding to one or more aggregation levels. In other words, one search space set may correspond to one or more aggregation levels, and one search space set may include a PDCCH candidate at the one or more aggregation levels.

Figure 4:
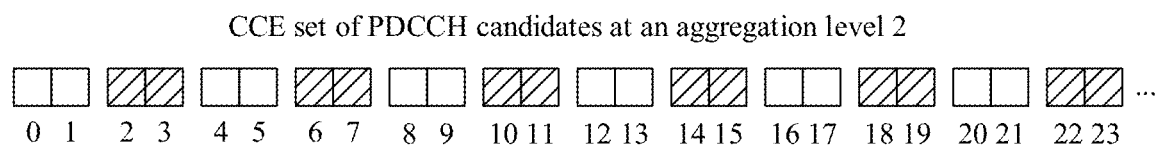
FIG. 4 is a schematic diagram of CCE index numbers of a PDCCH candidate in a CORESET.

When configuring a search space set for the terminal device, the base station configures an index number for each search space set. The search space set includes a PDCCH candidate, and each PDCCH candidate is located in a corresponding CORESET. Therefore, an index number of a search space set is associated with an index number of a CORESET in which a PDCCH candidate included in the search space set is located, and a CORESET associated with a search space set determines a CCE index that is of a PDCCH candidate in the search space set and that is in the CORESET. For example, there are a total of 24 CCEs in a CORESET, and a quantity of PDCCH candidates corresponding to an aggregation level AL=2 in a search space set is 6. In this case, for a CCE index number that is of each PDCCH candidate and that is in the CORESET, refer to FIG. 4. A diagonal block in FIG. 4 represents a PDCCH candidate.

In time domain, the terminal device monitors PDCCH candidates in a search space set at a specific time interval. Therefore, some time domain configuration information is configured for each search space set, and includes:

Monitoring periodicity: A monitoring periodicity is a time interval at which a search space set is monitored, and a unit is a slot.

Slot offset: A slot offset is a slot offset between starting of a monitoring periodicity and actual monitoring of a search space set. The slot offset is smaller than a value of the monitoring periodicity.

Slot quantity: A slot quantity is a quantity of slots in which a search space set is continuously monitored, and the slot quantity is less than a value of a monitoring periodicity.

Symbol position: A symbol position is a position of a start symbol of a CORESET associated with a search space set in each slot.

Figure 5:
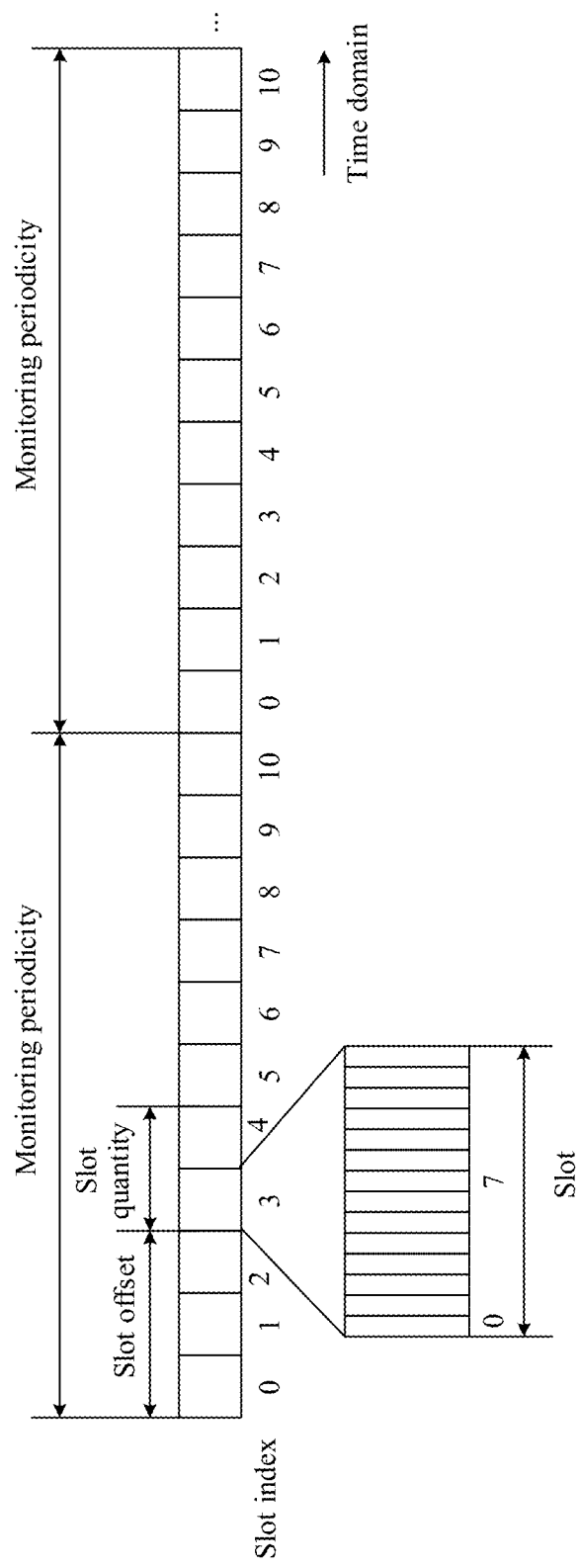
FIG. 5 is a schematic diagram of monitoring a PDCCH candidate in a search space set by a terminal device at a specific time interval.

For easy understanding, an example is used to describe a meaning of each parameter. As shown in FIG. 5, a monitoring periodicity is 10 slots, a slot offset is three slots, a slot quantity is two slots, a CORESET associated with a search space set is a CORESET that occupies two OFDM symbols, and symbol positions are an OFDM symbol 0 and an OFDM symbol 7 in a slot. In this example, the terminal device monitors a PDCCH candidate of the search space set in the CORESET on symbols 0 and symbols 7 in a slot 3 and a slot 4 in each monitoring periodicity of 10 slots, and the CORESET occupies two OFDM symbols in time domain.

In the NR system, the terminal device may be in different states, and one of the states is a radio resource control (RRC)_connected (CONNECTED) state. In the RRC_CONNECTED state, the terminal device has established an RRC context. In other words, a parameter required for communication between the terminal device and a radio access network is known to the terminal device and the radio access network. The RRC_CONNECTED state is mainly used for data transmission between the radio access network and the terminal device.

Generally, a packet-based data stream is usually bursty. There is data transmission in a time period, but there is no data transmission in a following relatively long time period. If the terminal device continuously monitors the PDCCH, useless work may be performed in a very long time, and power consumption of the terminal device is relatively high.

Currently, in the NR system, a discontinuous reception (DRX) processing mechanism may be configured for a terminal device. When there is no data transmission, the terminal device may be enabled to stop monitoring a PDCCH and stop corresponding data transmission, to reduce power consumption, and increase a battery use time.

Figure 6:
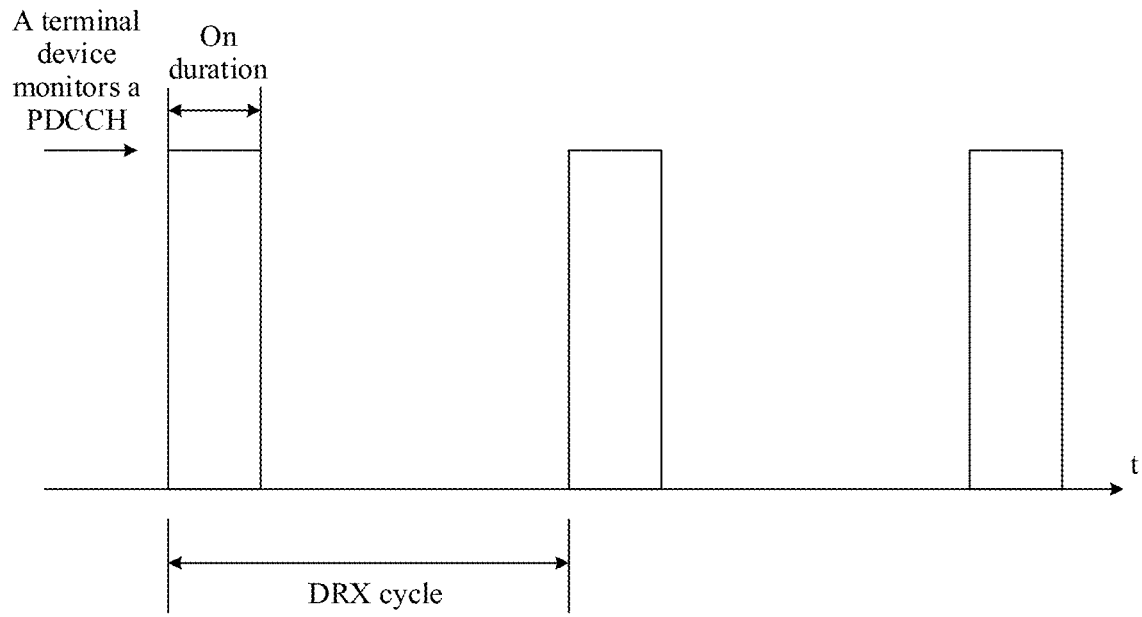
FIG. 6 is a schematic diagram of a DRX cycle.

In DRX, the base station may configure a DRX cycle for the terminal device in the RRC_CONNECTED state. The DRX cycle includes a time area of "on duration", as shown in FIG. 6.

Figure 7:
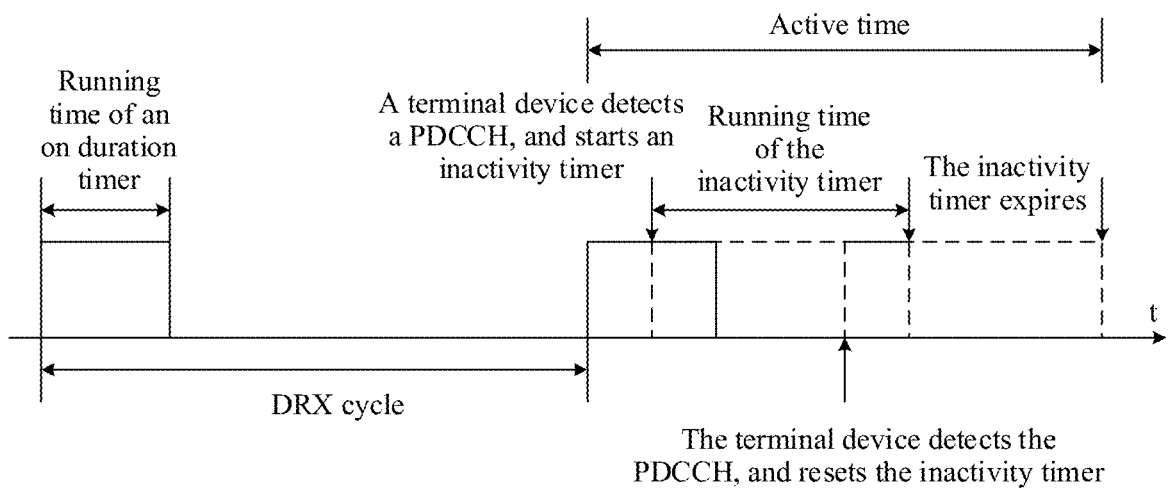
FIG. 7 is a schematic diagram of a working manner of a terminal device in a DRX cycle.

In a time of the "on duration", the terminal device may monitor the PDCCH. The terminal device starts a timer at a time start location (namely, a time start location of the "on duration") of each DRX cycle. A time length of the timer is a time length of the "on duration", and the timer may be referred to as a DRX-on-duration timer (drx-ondurationtimer), or an on duration timer for short. Timing duration of the on duration timer generally ranges from 1 ms to 1200 ms, and the terminal device monitors the PDCCH in the timing duration of the on duration timer. If the terminal device does not detect the PDCCH in the timing duration of the on duration timer, when the on duration timer expires, the terminal device enters a sleep state. In other words, the terminal device may turn off a receive circuit in a remaining time period of the DRX cycle, thereby reducing the power consumption of the terminal device. If the terminal device detects the PDCCH in the timing duration of the on duration timer, the terminal device starts an inactivity timer (drx-inactivitytimer) in the DRX mechanism. If the terminal device continues to detect the PDCCH in a running time of the inactivity timer, the terminal device resets the inactivity timer, so that the inactivity timer restarts counting. Similarly, after the inactivity timer restarts counting, if the terminal device detects the PDCCH again, the terminal device resets the inactivity timer again, so that the inactivity timer restarts counting. The rest can be deduced by analogy. If the inactivity timer is running, even if the originally configured on duration timer expires (that is, the time of the on duration ends), the terminal device still needs to continue monitoring the PDCCH, until the inactivity timer expires, as shown in FIG. 7.

In the DRX mechanism, there are some other timers, for example, a DRX downlink retransmission timer (which may also be referred to as drx-retransmissiontimerDL) and a DRX uplink retransmission timer (which may also be referred to as drx-retransmissiontimerUL). If any one of the foregoing timers (including the on duration timer, the inactivity timer, the DRX downlink retransmission timer, the DRX uplink retransmission timer, and the like) is running, the terminal device is in an "active time". In the DRX mechanism, if the terminal device is in the "active time", the terminal device needs to monitor the PDCCH. It should be noted that there may be some other cases in which the terminal device is in the "active time". Details are not described herein.

Figure 8:
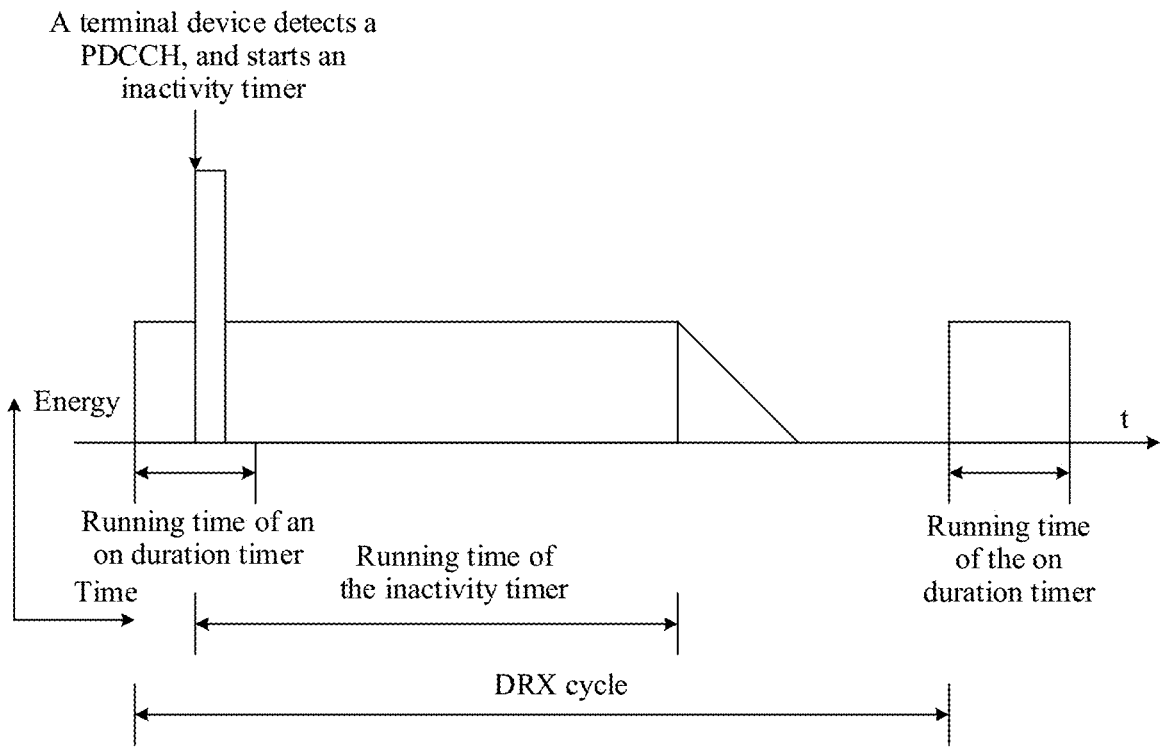
FIG. 8 is a schematic diagram of DRX energy consumption.

In the NR system, the terminal device works in a larger radio frequency bandwidth and a larger baseband bandwidth. FIG. 8 is a schematic diagram of DRX energy consumption. For the DRX mechanism, in a DRX cycle, the terminal device needs to first wake up from the sleep state, enable a radio frequency circuit and a baseband circuit, obtain time-frequency synchronization, and then monitor the PDCCH in an "on duration" time period. These processes require a lot of energy consumption. However, generally, data transmission is usually bursty and sparse in terms of time. If the base station does not schedule any data for the terminal device in the "on duration" time period, unnecessary energy consumption occurs for the terminal device. However, if the terminal device detects the PDCCH in a running time of the on duration timer, as described above, the terminal device starts an inactivity timer. Considering a latency requirement of data scheduling, a running time of the inactivity timer is generally far greater than the running time of the on duration timer. When the inactivity timer expires, the terminal device enters the sleep state (where an area shown by a triangle in FIG. 8 may represent a process in which the energy consumption of the terminal device gradually decreases). When the base station performs data scheduling for the terminal device once, the terminal device starts/resets the inactivity timer, and continues monitoring the PDCCH in a very long period of time. However, the base station may not perform any data scheduling for the terminal device in this period of time. Therefore, unnecessary energy consumption also occurs for the terminal device.

In view of this, the technical solutions in the embodiments of this application are provided. In the embodiments of this application, for example, the first signal may be used to indicate whether the network device schedules data in a next time. If the network device does not schedule data in a period of time after n moments, the network device may not send the first signal, and the terminal device does not detect the first signal at the n moments. In this case, the terminal device may not monitor a downlink control channel in a second time period, so that a probability that the terminal device performs useless work is reduced, and the power consumption of the terminal device is also reduced.

Figure 9:
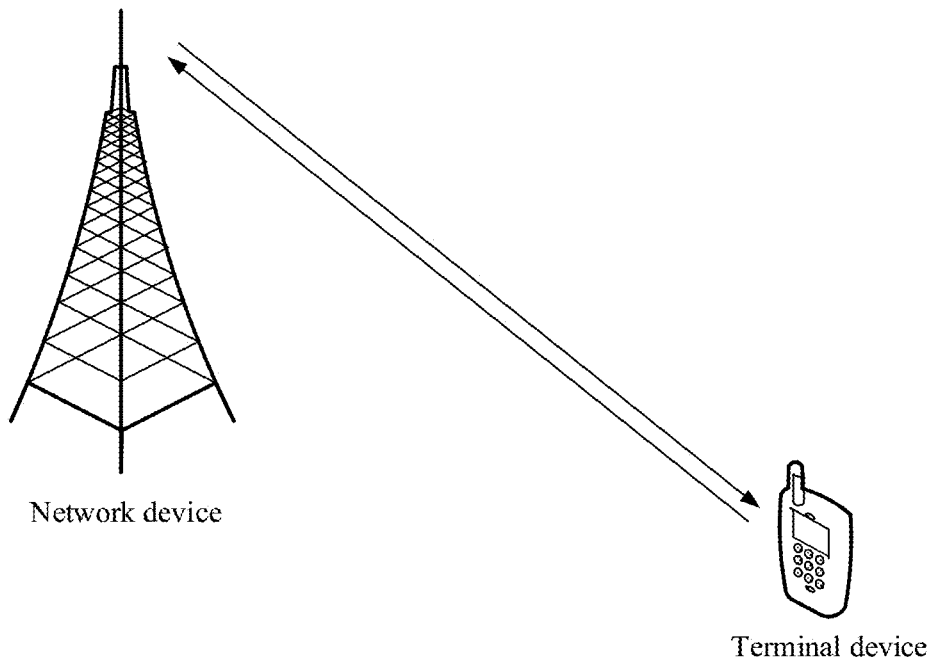
FIG. 9 is a schematic diagram of an application scenario according to an embodiment of this application.

FIG. 9 is a schematic diagram of an application scenario according to an embodiment of this application. FIG. 9 includes one network device and one terminal device. For example, the network device works in an evolved universal mobile telecommunications system terrestrial radio access (E-UTRA) system, or works in an NR system. Certainly, in this embodiment of this application, one network device may serve a plurality of terminal devices, and each of all or some terminal devices served by one network device may save energy in a manner in this embodiment of this application. In FIG. 9, one terminal device thereof is used only as an example.

For example, the network device in FIG. 9 is a base station. In different systems, the network device corresponds to different devices. For example, the network device may correspond to an eNB in a 4th generation (4G) system, and correspond to a 5G network device, such as a gNB, in a 5G system.

The following describes, with reference to the accompanying drawings, the technical solutions provided in the embodiments of this application.

Figure 10:
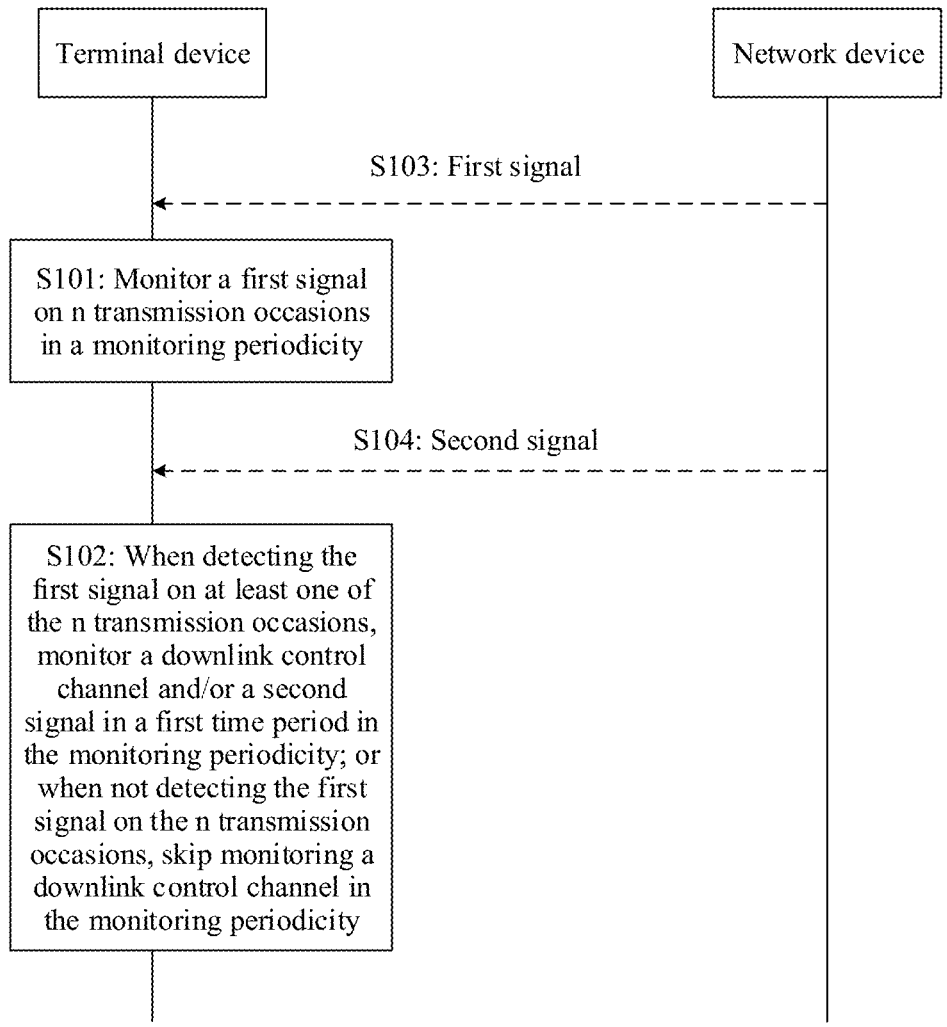
FIG. 10 is a flowchart of a channel monitoring method according to an embodiment of this application.

An embodiment of this application provides a channel monitoring method. FIG. 10 is a flowchart of the method. In the following description process, an example in which the method is used for the network architecture shown in FIG. 9 is used. In addition, the method may be performed by two communication apparatuses. The two communication apparatuses are, for example, a first communication apparatus and a second communication apparatus. The first communication apparatus may be a network device or a communication apparatus that can support a network device in implementing a function required for the method, or the first communication apparatus may be a terminal device or a communication apparatus that can support a terminal device in implementing a function required for the method. Certainly, the first communication apparatus may alternatively be another communication apparatus, for example, a chip system. Similarly, the second communication apparatus may be a network device or a communication apparatus that can support a network device in implementing a function required for the method, or the second communication apparatus may be a terminal device or a communication apparatus that can support a terminal device in implementing a function required for the method. Certainly, the second communication apparatus may alternatively be another communication apparatus, for example, a chip system. In addition, implementations of the first communication apparatus and the second communication apparatus are not limited. For example, the first communication apparatus may be a network device, and the second communication apparatus is a terminal device; or both the first communication apparatus and the second communication apparatus are network devices; or both the first communication apparatus and the second communication apparatus are terminal devices; or the first communication apparatus is a network device, and the second communication apparatus is a communication apparatus that can support a terminal device in implementing a function required for the method. For example, the network device is a base station.

For ease of description, the following uses an example in which the method is performed by a network device and a terminal device, that is, an example in which the first communication apparatus is a network device and the second communication apparatus is a terminal device. If this embodiment is used in a network architecture shown in FIG. 9, the network device configured to perform the embodiment shown in FIG. 10 in the following may be the network device in the network architecture shown in FIG. 9, and the terminal device in the following may be the terminal device in the network architecture shown in FIG. 9.

S101: The terminal device monitors a first signal on n transmission occasions in a monitoring periodicity, where n is a positive integer.

S102: When the terminal device detects the first signal on at least one of the n transmission occasions, the terminal device monitors a downlink control channel and/or a second signal in a first time period in the monitoring periodicity; or when the terminal device does not detect the first signal on the n transmission occasions, the terminal device skips monitoring a downlink control channel in the monitoring periodicity.

In this embodiment of this application, the network device may configure the terminal device to monitor a signal of a first type. The signal of the first type may be referred to as a first signal, a first wake up signal (WUS), or a first power saving signal. In an optional implementation, the network device may further configure the terminal device to monitor a signal of a second type. The signal of the second type may be referred to as a second signal, a second WUS signal, or a second power saving signal. In other words, the network device may configure the terminal device to monitor only the signal of the first type, and in this case, the terminal device monitors only the first signal. Alternatively, the network device may configure the terminal device to monitor the signal of the first type and the signal of the second type, and in this case, the terminal device monitors the first signal and the second signal. For example, the first signal may be a UE specific signal, namely, a signal for a terminal device, or may be a UE-group specific signal, namely, a signal for each terminal device in a terminal device group. Similarly, the second signal may be a UE specific signal, or may be a UE-group specific signal. This is not specifically limited.

For example, the terminal device may monitor the first signal based on a specific monitoring periodicity of monitoring. For example, if duration of a monitoring periodicity is first duration, the terminal device may monitor the first signal at an interval of the first duration. For example, the first duration may be represented as P1. In other words, the terminal device may monitor the first signal based on a periodicity P1. Each time the terminal device performs monitoring, the terminal device may monitor the first signal on n transmission occasions, in other words, the terminal device may monitor the first signal in n transmission occasions. A value of n may be semi-statically configured for the terminal device by using higher layer signaling. The higher layer signaling is, for example, RRC signaling or media access control (MAC) layer signaling.

Figure 11A:
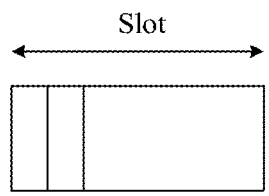
FIG. 11A and FIG. 11B are schematic diagrams in which n transmission occasions are n consecutive transmission occasions according to an embodiment of this application.
Figure 11B:
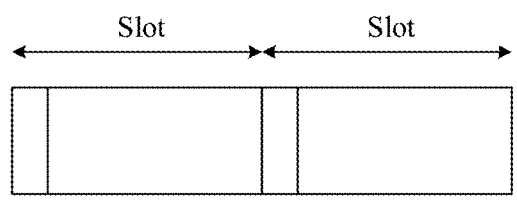

In an implementation, the n transmission occasions may be n consecutive transmission occasions, that is, the n transmission occasions are consecutive. For example, the n transmission occasions may be n consecutive OFDM symbols in one slot. As shown in FIG. 11A, the network device may send the first signal on each of the n transmission occasions, so as to improve reliability and a coverage capability of the first signal; or the network device may alternatively send the first signal only on some of the n transmission occasions, where in FIG. 11A, n=2 is used as an example. Alternatively, the n transmission occasions may be located in a plurality of consecutive slots, and although the slots in which the n transmission occasions are located are consecutive, the n transmission occasions may be inconsecutive, as shown in FIG. 11B; however, in this case, it is also considered that the n transmission occasions are n consecutive transmission occasions. The network device may send the first signal in any one or more of the plurality of slots in which the n transmission occasions are located, so that flexibility of scheduling data by the network device is improved. If then transmission occasions are located in a plurality of slots, a quantity of slots in which the n transmission occasions are located may be less than or equal to n. For example, if the quantity of slots in which the n transmission occasions are located is equal to n, one transmission occasion is located in one slot; or, if the quantity of slots in which then transmission occasions are located is less than n, a plurality of transmission occasions may be located in one slot, and quantities of transmission occasions included in different slots may be the same or may be different. This is not specifically limited. Enabling the n transmission occasions to be consecutive transmission occasions is more convenient for monitoring of the terminal device, and reduces complexity of the monitoring of the terminal device.

Alternatively, in another implementation, the n transmission occasions may be n inconsecutive transmission occasions. For example, every two of then transmission occasions are inconsecutive, or at least two adjacent transmission occasions in the n transmission occasions are inconsecutive. For example, the n transmission occasions may be n inconsecutive OFDM symbols in one slot, or the n transmission occasions may be located in a plurality of inconsecutive slots. This is not specifically limited.

In this embodiment of this application, when the network device has data to be scheduled, the network device may send the first signal, and the first signal may also be considered as an energy saving signal. In this case, if the terminal device does not detect the first signal in all n transmission occasions in a monitoring periodicity, it indicates that the network device does not perform data scheduling in a subsequent time, or indicates that the terminal device needs to save energy. In this case, the terminal device may enter a "sleep" state, the terminal device does not need to monitor the downlink control channel, and does not need to monitor the second signal either. When a next monitoring periodicity arrives, the terminal device monitors the first signal on n transmission occasions in the next monitoring periodicity. This manner enables the terminal device to implement energy saving.

However, if the terminal device detects the first signal on at least one of the n transmission occasions in a monitoring periodicity, the terminal device may continue monitoring the first signal in the first time period. For example, the terminal device may monitor the downlink control channel and the second signal in the first time period, or monitor the second signal in the first time period, or monitor the downlink control channel in the first time period. For example, if the first signal is a UE specific signal, the terminal device may monitor the downlink control channel and the second signal in the first time period, or monitor the second signal in the first time period, or monitor the downlink control channel in the first time period. If the first signal is a UE-group specific signal, the terminal device may monitor the second signal in the first time period. If the second signal is a UE-group specific signal, the network device may not simultaneously "wake up" all terminal devices in the group to receive the downlink control channel. Therefore, the terminal device may first monitor the second signal in the first time period. Certainly, this is merely an example, and is not specifically limited thereto. For example, the first signal is a UE-group specific signal, and the terminal device may also monitor the downlink control channel and the second signal in the first time period, or monitor the second signal in the first time period, or monitor the downlink control channel in the first time period.

In FIG. 10, an example in which the network device sends the first signal to the terminal device is used. Refer to S103 in FIG. 10. Because the network device does not necessarily send the first signal to the terminal device, S103 is represented by a dashed line. A sequence of the two steps of sending the first signal by the network device and monitoring the first signal by the terminal device may be uncertain. For example, the network device may first send the first signal, and then the terminal device monitors the first signal. Alternatively, the terminal device may simultaneously monitor the first signal when the network device sends the first signal. Alternatively, the terminal device may start to monitor the first signal before the network device sends the first signal. This is not specifically limited.

In FIG. 10, an example in which the network device sends the second signal to the terminal device is also used. Refer to S104 in FIG. 10. Because the network device does not necessarily send the second signal to the terminal device, S104 is represented by a dashed line. In addition, a sequence of the two steps of sending the first signal by the network device and monitoring the second signal by the terminal device may be uncertain. For example, the network device may first send the first signal and the terminal device monitors the first signal, and then the network device sends the second signal and the terminal device monitors the second signal. Certainly, this is not specifically limited. Similarly, a sequence of the two steps of sending the second signal by the network device and monitoring the second signal by the terminal device may be uncertain. For example, the network device may first send the second signal, and then the terminal device monitors the second signal. Alternatively, the terminal device may simultaneously monitor the second signal when the network device sends the second signal. Alternatively, the terminal device may start to monitor the second signal before the network device sends the second signal. This is not specifically limited.

Alternatively, when sending the second signal, the network device may periodically send the second signal. In this case, the terminal device may periodically monitor the second signal in timing duration of a first timer (or in a running time of the first timer). A length of a monitoring periodicity of the second signal may be equal to or may not be equal to a length of a monitoring periodicity of the first signal. For example, if the monitoring periodicity of the first signal is already represented by P1 and the length of the monitoring periodicity of the second signal is represented by P2, P2 may be less than or equal to P1. The monitoring periodicity of the second signal may be determined based on a monitoring periodicity of a search space set (or a transmission occasion of a search space set) in which a DCI format 1-1/DCI format 0-1 (or another DCI format, for example, a DCI format 0-0/1-0) of monitoring of the terminal device is located. In this case, the terminal device may synchronously monitor the downlink control channel and the second signal, and monitoring efficiency is relatively high. Alternatively, the monitoring periodicity of the second signal may be a monitoring periodicity of a search space set associated with the second signal. For example, the network device may configure an index number of the search space set associated with the second signal.

To avoid confusion, the following separately describes different monitoring cases of the terminal device.

1. In a first implementation in which the terminal device detects the first signal, the terminal device monitors the downlink control channel and the second signal.

In this implementation, if the terminal device detects the first signal on one of the n transmission occasions for the first time, the terminal device may start the first timer, and timing for the first time period may be performed by using the first timer. In other words, timing duration of the first timer is a length of the first time period. In addition, the network device may also start the first timer. The transmission occasion on which the terminal device detects the first signal for the first time may be any one of the n transmission occasions. The terminal device may start the first timer immediately after detecting the first signal for the first time. Alternatively, the terminal device may start the first timer at a predefined time domain position that exists after the first signal is detected for the first time. For example, the predefined time domain position may be a slot whose distance from a slot of the transmission occasion on which the first signal is detected for the first time is m, where m is greater than or equal to 0, and if m=0, the terminal device starts the first timer in the slot in which the first signal is detected for the first time. Alternatively, regardless of a transmission occasion on which the terminal device detects the first signal in the n transmission occasions, the terminal device may start the first timer after the n transmission occasions end. For example, the terminal device may start the first timer at a predefined time domain position after then transmission occasions. For example, the predefined time domain position may be a slot with a distance of m from a slot in which a last transmission occasion in the n transmission occasions is located in time domain, where m is greater than or equal to 0. For example, if m=0, the terminal device starts the first timer in the slot in which the last transmission occasion in the n transmission occasions is located; if m=1, the terminal device starts the first timer in a 1st slot after the slot in which the last transmission occasion in the n transmission occasions is located; or the like. Alternatively, because in this implementation, the terminal device further needs to monitor the downlink control channel in the first time period, the terminal device may start the first timer at a first moment closest to the last transmission occasion in the n transmission occasions. The first moment is a moment at which the terminal device monitors the search space set. In other words, the terminal device may monitor the search space set at a plurality of moments after the n transmission occasions. In this case, the terminal device may select, from the moments for monitoring the search space set, the moment closest to the last transmission occasion in the n transmission occasions, and start the first timer at the moment. In this way, in the first time period, the terminal device may directly monitor the downlink control channel, so that the monitoring is performed in a relatively timely manner. Specifically, when the terminal device starts the first timer is not limited in this embodiment of this application.

In this implementation, whether the terminal device detects the second signal in the timing duration of the first timer may not affect monitoring the downlink control channel by the terminal device. For example, the terminal device monitors the downlink control channel and the second signal in the first time period. When the terminal device has not detected the second signal, the terminal device may continue monitoring the downlink control channel. When the terminal device detects the second signal, or when the terminal device detects the second signal and the second signal indicates to reset the first timer (or indicates to continue monitoring the downlink control channel), it may also be considered that in this case, the second signal indicates an "active" state or a "wake up" state, and the terminal device may still continue monitoring the downlink control channel.

However, if the terminal device has not detected the second signal in the first time period, although the terminal device continues monitoring the downlink control channel, the timing duration of the first timer does not change, and the first timer continues running. If the terminal device has not detected the second signal when the first timer expires, that is, the first time period ends, monitoring the downlink control channel and the second signal by the terminal device ends, and the terminal device stops monitoring the downlink control channel and the second signal.

However, if the terminal device detects the second signal in the first time period, or the terminal device detects the second signal in the first time period and the second signal indicates to reset the first timer (or the second signal indicates to continue monitoring the downlink control channel), the terminal device may continue monitoring the downlink control channel, and the terminal device further resets the first timer, that is, performs zero clearing on the first timer, so that the first timer restarts timing. The terminal device continues monitoring the downlink control channel and the second signal in timing duration of the reset first timer. The network device also resets the first timer. For example, the network device may send the downlink control channel and/or the second signal in the timing duration of the reset first timer. Certainly, the network device may send neither the downlink control channel nor the second signal.

If the terminal device detects the second signal in the timing duration of the reset first timer, or the terminal device detects the second signal in the timing duration of the reset first timer and the second signal indicates to reset the first timer (or the second signal indicates to continue monitoring the downlink control channel), the terminal device may continue monitoring the downlink control channel, and the terminal device resets the first timer again, that is, performs zero clearing on the first timer, so that the first timer restarts timing again. The terminal device continues monitoring the downlink control channel and the second signal in timing duration of the first timer that has been reset again. The network device also resets the first timer again. For example, in the timing duration of the reset first timer, the network device may send the downlink control channel and/or the second signal; or certainly may send neither the downlink control channel nor the second signal. The rest can be deduced by analogy.

When the network device has data to be scheduled, the network device may send the second signal, and the second signal may also be considered as an energy saving signal. For example, if data scheduling of the network device can be implemented in the first time period, the network device may not need to send the second signal; and then the terminal device does not detect the second signal in the first time period, and the terminal device stops monitoring the downlink control channel and the second signal when the first time period ends. In this case, the network device has completed sending, the terminal device also has completed monitoring on all downlink control channels sent by the network device, and the terminal device implements energy saving to some extent. Alternatively, if data scheduling of the network device cannot be completed in the first time period, and a receiving time of the terminal device needs to be prolonged, the network device may send the second signal, or the network device sends the second signal and the second signal indicates to reset the first timer (or indicates to continue monitoring the downlink control channel). The terminal device may reset the first timer based on the second signal, and monitor the downlink control channel in timing duration of the reset first timer. The network device may also reset the first timer, and send the downlink control channel in the timing duration of the reset first timer; or certainly may not send the downlink control channel. It can be learned that a time length of monitoring the downlink control channel by the terminal device can be prolonged by sending the second signal, so that the terminal device can detect the downlink control channel sent by the network device.

In another case, if the network device sends the second signal, and the second signal indicates not to reset the first timer (or indicates to suspend monitoring the downlink control channel), it may also be considered that the second signal indicates the "sleep" state. In this case, when the terminal device detects the second signal, the terminal device may stop monitoring the downlink control channel. However, it may be unsuitable for the terminal device to stop, for a long time, monitoring the downlink control channel. Therefore, the terminal device may stop monitoring the downlink control channel in a third time period, and the terminal device may not monitor the second signal in the third time period. In other words, if a transmission occasion of the second signal occurs in the third time period, the UE may not monitor the second signal on the transmission occasion. The third time period may be considered as "sleep duration" of the terminal device, and the terminal device may enter the "sleep" state in the third time period. The "sleep" state may be a state in which the terminal device stops monitoring the downlink control channel and the second signal. A length of the third time period may be configured by using higher layer signaling, or may be specified by a protocol, or may be indicated by a second signal used to indicate not to reset the first timer (or indicate to suspend monitoring the downlink control channel). In the third time period, the terminal device may keep the first timer running. If the third time period ends before the first timer expires, that is, the terminal device wakes up before the first timer expires, the terminal device may continue monitoring the downlink control channel and the second signal in a remaining timing time of the first timer. However, if the third time period ends when the first timer expires, or can end only after the first timer expires, the terminal device stops monitoring the downlink control channel and the second signal when the first timer expires.

The network device may send the second signal when having data to be scheduled (where the second signal may be used as the energy saving signal). In this case, information carried in the second signal is not limited. Then, if the network device does not send the second signal, that is, provided that the terminal device does not detect the second signal, the terminal device does not reset the first timer, and when the first timer expires, the terminal device stops monitoring the downlink control channel and the second signal. However, if the network device sends the second signal, when the terminal device detects the second signal, the terminal device resets the first timer, and continues monitoring the downlink control channel. This implementation of the second signal is relatively simple, and the terminal device may determine, based on whether the second signal is detected, how to perform an operation.

Alternatively, the network device may indicate, by using information carried in the second information, whether to perform data scheduling (or use the second signal as the energy saving signal). In this case, the network device may send the second signal, and different information carried in the second signal may indicate different cases. For example, the second signal carries information of 1 bit. If a value of the 1 bit is "0", it indicates not to reset the first timer (or indicates to suspend monitoring the downlink control channel). If a value of the 1 bit is "1", it indicates to reset the first timer (or continue monitoring the downlink control channel). For example, if the network device sends the second signal and the second signal indicates not to reset the first timer (or indicates to suspend monitoring the downlink control channel), the terminal device detects the second signal and determines that the second signal indicates not to reset the first timer (or indicates to suspend monitoring the downlink control channel), and the terminal device stops monitoring the downlink control channel in the third time period. Alternatively, if the network device sends the second signal and the second signal indicates to reset the first timer (or indicates to continue monitoring the downlink control channel), the terminal device detects the second signal and determines that the second signal indicates to reset the first timer (or indicates to continue monitoring the downlink control channel), and the terminal device resets the first timer and continues monitoring the downlink control channel. In this implementation of the second signal, the indication may be clearer.

In the running time of the first timer, the network device may further send the first signal. For example, the first signal is a UE-group specific signal. In this case, to meet a requirement of a group of terminal devices, the network device may send the first signal for a plurality of times. Therefore, for a terminal device, even if the terminal device is already in the running time of the first timer, the terminal device may receive the first signal sent by the network device. However, in this embodiment of this application, to avoid confusion of the terminal device, the terminal device may not monitor the first signal when the first timer runs. In other words, in the running time of the first timer, the terminal device does not monitor the first signal, and even if the network device sends the first signal, the terminal device does not receive the first signal.

In an implementation, the network device may indicate the length of the first time period by using the first signal, or the length of the first time period may be specified in a protocol. In addition, after the first timer is reset, the first timer further has corresponding timing duration. The timing duration after the resetting of the first timer may be equal to or not equal to timing duration before the resetting of the first timer. This is not specifically limited. If the timing duration after the resetting of the first timer is not equal to the timing duration before the resetting of the first timer, the timing duration after the resetting of the first timer may be indicated by the network device, specified in a protocol, or the like.

In an implementation, the network device may indicate the length of the first time period by using the first signal. After the UE enters the first time period, if the UE starts or resets the first timer when the UE detects the second signal or the downlink control channel, the length of the first timer may be equal to or may not be equal to the length of the first time period.

Figure 12:
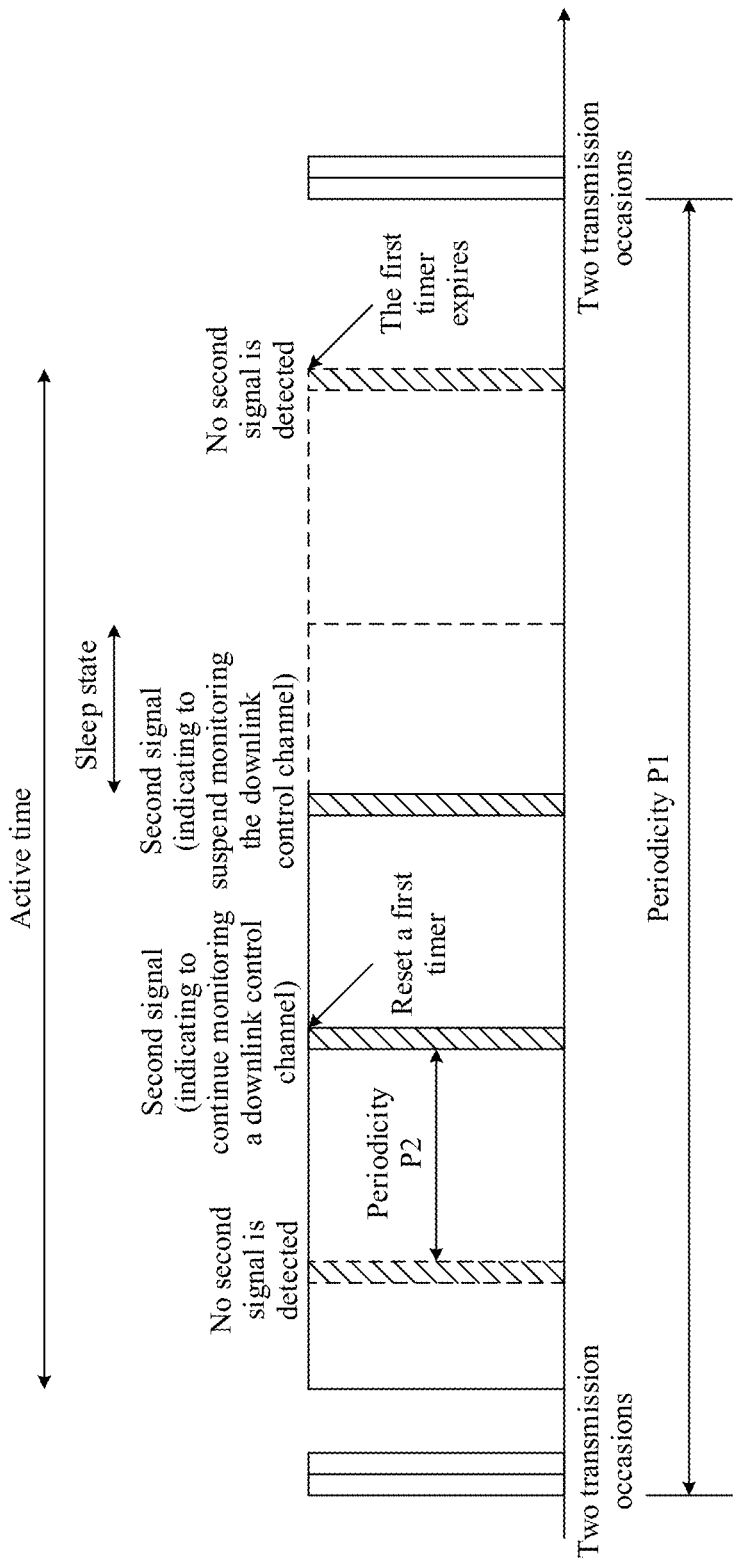
FIG. 12 is a schematic diagram of monitoring a first signal and a second signal by a terminal device according to an embodiment of this application.

FIG. 12 shows an example of a process in which the terminal device monitors the first signal and the second signal in the first implementation. In FIG. 12, n=2 is used as an example. The terminal device monitors the first signal on two transmission occasions shown on the left of FIG. 12. If the terminal device does not detect the first signal on the two transmission occasions, the terminal device enters the sleep state, and remains in the sleep state until a next monitoring periodicity arrives. Then, the terminal device monitors the first signal on two transmission occasions in the next monitoring periodicity. The two transmission occasions in the next monitoring periodicity are two transmission occasions shown on the right in FIG. 12. However, if the terminal device detects the first signal on one of the two transmission occasions, the terminal device starts the first timer, to enter the first time period. In the first time period, the terminal device monitors the downlink control channel, and monitors the second signal based on the periodicity P2. Locations shown by diagonal boxes in FIG. 12 represent locations at which the terminal device monitors the second signal. For example, the terminal device does not detect the second signal in first-time monitoring, and then the terminal device continues monitoring the downlink control channel, keeps the first timer running, and detects the second signal in second-time monitoring, where the second signal indicates to continue monitoring the downlink control channel (where in FIG. 12, it is represented that the second signal indicates to monitor the downlink control channel; in this embodiment of this application, indicating to "continue monitoring the downlink control channel" and indicating to "monitor the downlink control channel" may be understood as a same concept, and may be interchanged). In this case, the terminal device resets the first timer, and continues monitoring the downlink control channel and the second signal in the timing duration of the reset first timer. If the second signal is detected again in third-time monitoring and the second signal indicates to suspend monitoring the downlink control channel, the terminal device stops monitoring the downlink control channel and enters the sleep state. For example, if the first timer does not expire after the terminal device wakes up from the sleep state, the terminal device continues monitoring the downlink control channel and the second signal until the first timer expires, and then the terminal device stops monitoring the downlink control channel and the second signal. An entire running time of the first timer, from the first time period to the expiration of the first timer, is considered as an "active time" of the terminal device.

2. In a second implementation in which the terminal device detects the first signal, the terminal device monitors the second signal.

In this implementation, if the terminal device detects the first signal on one of the n transmission occasions for the first time, the terminal device may start the first timer, and timing for the first time period is performed by using the first timer. In other words, the timing duration of the first timer is the length of the first time period. The transmission occasion on which the terminal device detects the first signal for the first time may be any one of the n transmission occasions. For an occasion on which the terminal device starts the first timer, refer to related descriptions in the first implementation in which the terminal device detects the first signal in the $1^{st}$ case. Details are not described.

In this implementation, whether the terminal device detects the second signal in the timing duration of the first timer affects monitoring the downlink control channel by the terminal device. For example, the terminal device monitors the second signal in the first time period. When the terminal device has not detected the second signal, the terminal device does not monitor the downlink control channel. When the terminal device detects the second signal, or when the terminal device detects the second signal and the second signal indicates to reset the first timer (or indicates to monitor the downlink control channel), it may also be considered that in this case, the second signal indicates the "active" state, and the terminal device may reset the first timer and start to monitor the downlink control channel. The "active" state may refer to a state in which the first timer is reset and the downlink control channel starts to be monitored. Certainly, because the second signal is periodically sent, after the terminal device detects the second signal for the first time, the terminal device may further detect the second signal again. If the terminal device detects the second signal again, or the terminal device detects the second signal again and the second signal indicates to reset the first timer (or indicates to monitor the downlink control channel), the terminal device may reset the first timer and continue monitoring the downlink control channel.

If the terminal device has not detected the second signal when the first timer expires, that is, when the first time period ends, monitoring the second signal by the terminal device ends, and the terminal device stops monitoring the second signal. In this case, although the terminal device has not monitored the downlink control channel, because the second signal is no longer monitored, it is equivalent to that monitoring the downlink control channel by the terminal device ends.

However, if the terminal device detects the second signal in the first time period for the first time, or the terminal device detects the second signal in the first time period for the first time and the second signal indicates to reset the first timer (or the second signal indicates to monitor the downlink control channel), the terminal device starts to monitor the downlink control channel, and the terminal device further resets the first timer, that is, performs zero clearing on the first timer, so that the first timer restarts timing. In timing duration of the reset first timer, the terminal device starts to monitor the downlink control channel, or may continue monitoring the second signal. Subsequently, if the terminal device detects the second signal in the timing duration of the reset first timer, or the terminal device detects the second signal in the timing duration of the reset first timer and the second signal indicates to reset the first timer (or the second signal indicates to monitor the downlink control channel), the terminal device may continue monitoring the downlink control channel, and the terminal device further resets the first timer again, that is, performs zero clearing on the first timer, so that the first timer restarts timing again. The terminal device continues monitoring the downlink control channel and the second signal in timing duration of the first timer that has been reset again. The rest can be deduced by analogy When the network device has data to be scheduled, the network device may send the second signal, and the second signal may be considered as an energy saving signal. For example, if the network device does not have data to be scheduled in the first time period, the network device may not need to send the second signal. In this case, the terminal device does not detect the second signal in the first time period, and does not monitor the downlink control channel. In this way, the terminal device implements energy saving to some extent. Alternatively, if the network device has data to be scheduled, the data scheduling cannot be completed in the first time period, and a receiving time of the terminal device needs to be prolonged, the network device may send the second signal, or the network device sends the second signal and the second signal indicates to reset the first timer (or indicates to monitor the downlink control channel). The terminal device may reset the first timer based on the second signal, and monitor the downlink control channel in timing duration of the reset first timer. It can be learned that the time length of monitoring the downlink control channel by the terminal device can be prolonged by sending the second signal, so that the terminal device can detect the downlink control channel sent by the network device.

In another case, if the network device sends the second signal, and the second signal indicates not to reset the first timer (or indicates not to monitor the downlink control channel, or indicates to suspend monitoring the downlink control channel), it may also be considered that in this case, the second signal indicates the "sleep" state. Then, the terminal device may stop monitoring the downlink control channel when the terminal device detects the second signal. However, because it may not be suitable for the terminal device to stop, for a long time, monitoring the downlink control channel, the terminal device may stop monitoring the downlink control channel in the third time period. The third time period may be considered as the "sleep duration" of the terminal device, and the terminal device may enter the "sleep" state in the third time period. The length of the third time period may be configured by using the higher layer signaling, or may be specified by the protocol, or may be indicated by the second signal used to indicate not to reset the first timer (or indicate not to monitor the downlink control channel, or indicate to suspend monitoring the downlink control channel). In the third time period, the terminal device may keep the first timer running. If the third time period ends before the first timer expires, that is, the terminal device wakes up before the first timer expires, the terminal device may continue monitoring the second signal in the remaining timing time of the first timer. However, if the third time period ends when the first timer expires, or can end only after the first timer expires, the terminal device stops monitoring the downlink control channel and the second signal when the first timer expires.

The network device may send the second signal to indicate to perform data scheduling (or use the second signal as the energy saving signal). In this case, the information carried in the second signal is not limited. Then, if the network device does not send the second signal, that is, provided that the terminal device does not detect the second signal, the terminal device does not reset the first timer and does not monitor the downlink control channel either, and when the first timer expires, the terminal device stops monitoring the second signal. However, if the network device sends the second signal, when the terminal device detects the second signal, the terminal device resets the first timer, and monitors the downlink control channel. This implementation of the second signal is relatively simple, and the terminal device may determine, based on whether the second signal is detected, how to perform an operation.

Alternatively, the network device may indicate, by using information carried in the second information, whether to perform data scheduling (or use the second signal as the energy saving signal). In this case, the network device may send the second signal, and different information carried in the second signal may indicate different cases. For example, the second signal carries information of 1 bit. If a value of the 1 bit is "0", it indicates not to reset the first timer (or indicates not to monitor the downlink control channel, or indicates to suspend monitoring the downlink control channel). If a value of the 1 bit is "1", it indicates to reset the first timer (or monitor the downlink control channel). For example, if the network device sends the second signal and the second signal indicates not to reset the first timer (or indicates not to monitor the downlink control channel, or indicates to suspend monitoring the downlink control channel), the terminal device detects the second signal and determines that the second signal indicates not to reset the first timer (or indicates not to monitor the downlink control channel, or indicates to suspend monitoring the downlink control channel), and the terminal device stops monitoring the downlink control channel in the third time period. Alternatively, if the network device sends the second signal and the second signal indicates to reset the first timer (or indicates to monitor the downlink control channel), the terminal device detects the second signal and determines that the second signal indicates to reset the first timer (or indicates to monitor the downlink control channel), and the terminal device resets the first timer and monitors the downlink control channel. In this implementation of the second signal, the indication may be clearer.

In the running time of the first timer, the network device may further send the first signal. For example, the first signal is a UE-group specific signal. In this case, to meet a requirement of a group of terminal devices, the network device may send the first signal for a plurality of times. Therefore, for a terminal device, even if the terminal device is already in the running time of the first timer, the terminal device may receive the first signal sent by the network device. However, in this embodiment of this application, to avoid the confusion of the terminal device, the terminal device may not monitor the first signal when the first timer runs. In other words, in the running time of the first timer, the terminal device does not monitor the first signal, and even if the network device sends the first signal, the terminal device does not receive the first signal.

In an implementation, the network device may indicate the length of the first time period by using the first signal, or the length of the first time period may be specified in a protocol. In addition, after the first timer is reset, the first timer further has the corresponding timing duration. The timing duration after the resetting of the first timer may be equal to or not equal to the timing duration before the resetting of the first timer. This is not specifically limited. If the timing duration after the resetting of the first timer is not equal to the timing duration before the resetting of the first timer, the timing duration after the resetting of the first timer may be indicated by the network device, specified in a protocol, or the like.

In an implementation, the network device may indicate the length of the first time period by using the first signal. After the UE enters the first time period, if the UE starts or resets the first timer when the UE detects the second signal, the length of the first timer may be equal to or may not be equal to the length of the first time period.

For an example of a process in which the terminal device monitors the first signal and the second signal in the second implementation, refer to FIG. 12. In FIG. 12, n=2 is used as an example. The terminal device monitors the first signal on the two transmission occasions shown on the left of FIG. 12. If the terminal device does not detect the first signal on the two transmission occasions, the terminal device enters the sleep state, and remains in the sleep state until the next monitoring periodicity arrives. Then, the terminal device monitors the first signal on the two transmission occasions in the next monitoring periodicity. The two transmission occasions in the next monitoring periodicity are the two transmission occasions shown on the right in FIG. 12. However, if the terminal device detects the first signal on one of the two transmission occasions, the terminal device starts the first timer, to enter the first time period. In the first time period, the terminal device monitors the second signal based on the periodicity P2. The locations shown by the diagonal boxes in FIG. 12 represent the locations at which the terminal device monitors the second signal. For example, if the terminal device does not detect the second signal in first-time monitoring, the terminal device does not monitor the downlink control channel, and keeps the first timer running. If the terminal device detects the second signal in second-time monitoring, and the second signal indicates to monitor the downlink control channel, the terminal device resets the first timer, and monitors the downlink control channel and the second signal in timing duration of the reset first timer. If the second signal is detected again in third-time monitoring and the second signal indicates to suspend monitoring the downlink control channel, the terminal device stops monitoring the downlink control channel and enters the sleep state. For example, if the first timer does not expire after the terminal device wakes up from the sleep state, the terminal device continues monitoring the second signal until the first timer expires, and then the terminal device stops monitoring the downlink control channel and the second signal. An entire running time of the first timer from the first time period to the expiration of the first timer is considered as the "active time" of the terminal device.

3. In a third implementation in which the terminal device detects the first signal, the terminal device monitors the downlink control channel.

In this implementation, the network device configures the terminal device to monitor only the signal of the first type, that is, monitor only the first signal. The network device does not send the second signal, and the terminal device does not monitor the second signal either.

In this implementation, if the terminal device detects the first signal on one of the n transmission occasions for the first time, the terminal device may start the first timer, and timing for the first time period is performed by using the first timer. In other words, the timing duration of the first timer is the length of the first time period. The transmission occasion on which the terminal device detects the first signal for the first time may be any one of the n transmission occasions. For the occasion on which the terminal device starts the first timer, refer to related descriptions in the first implementation in which the terminal device detects the first signal in the $1^{st}$ case. Details are not described.

The network device may indicate the length of the first time period by using the first signal. In this case, after the terminal device detects the first signal (e.g., after the terminal device detects the first signal for the first time), the terminal device may determine duration of the first time period based on the first signal, or duration of the first time period may be specified in a protocol, or may be indicated by the network device by using other signaling (e.g., higher layer signaling). The length of the first time period is not limited, for example, may be one or more slots, or may be one or more symbols.

For example, the first signal may indicate the length of the first time period, or in other words, indicate the first time period. For example, the first signal may indicate the first time period by using 1 bit. If a value of the 1 bit is "1", it indicates that the first time period is the first half of the periodicity P1. If a value of the 1 bit is "0", it indicates that the first time period is the second half of the periodicity P1. Alternatively, the first signal indicates the first time period by using 2 bits. A high-order bit in the 2 bits is used to represent the first half of the periodicity P1, and a low-order bit in the 2 bits is used to represent the second half of the periodicity P1. If a value of the high-order bit in the 2 bits is "1", it indicates that the first time period is the first half of the periodicity P1. If a value of the low-order bit in the 2 bits is "1", it indicates that the first time period is the second half of the periodicity P1. Certainly, when the value of the high-order bit in the 2 bits is "1", the value of the low-order bit in the 2 bits is "0". When the value of the low-order bit in the 2 bits is "1", the value of the high-order bit in the 2 bits is "0". Certainly, the first time period may alternatively be indicated by using more bits in the first signal; the first time period may be indicated in different manners by using a same bit; or the like. How to indicate the first time period by using the first signal is not limited in the embodiments of this application.

Figure 13:
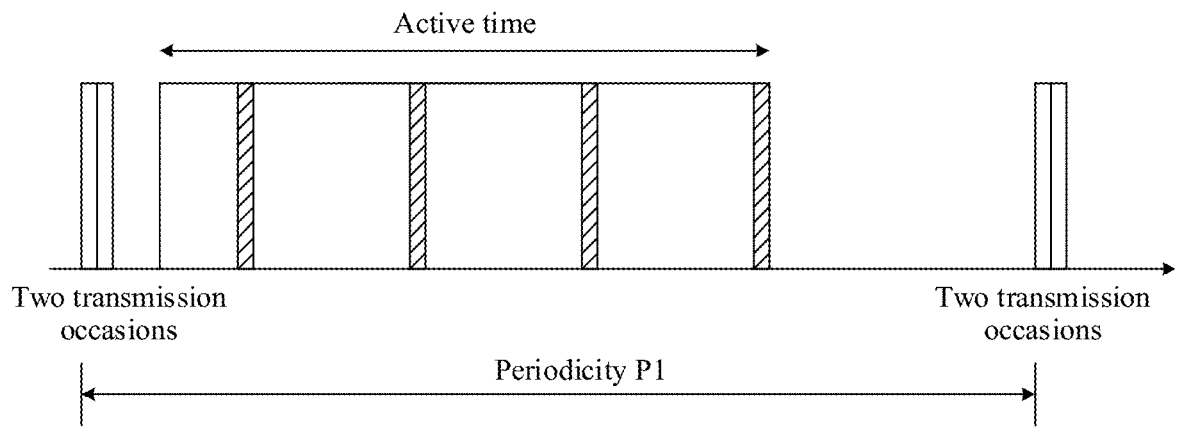
FIG. 13 is a schematic diagram of monitoring a first signal by a terminal device according to an embodiment of this application.

FIG. 13 shows an example of a process in which the terminal device monitors the first signal in the third implementation. In FIG. 13, n=2 is used as an example. The terminal device monitors the first signal on two transmission occasions shown on the left of FIG. 13. If the terminal device does not detect the first signal on the two transmission occasions, the terminal device enters the sleep state, and remains in the sleep state until a next monitoring periodicity arrives. Then, the terminal device monitors the first signal on two transmission occasions in the next monitoring periodicity. The two transmission occasions in the next monitoring periodicity are two transmission occasions shown on the right in FIG. 13. However, if the terminal device detects the first signal on one of the two transmission occasions, the terminal device may enter the first time period, where the length of the first time period is obtained by the terminal device based on the first signal. In the first time period, the terminal device monitors the downlink control channel. The terminal device also monitors the downlink control channel based on a monitoring periodicity of a search space set. The monitoring periodicity of the search space set is a location shown by a diagonal box in FIG. 13. The terminal device does not stop monitoring the downlink control channel, until the first timer expires. The first time period may be considered as the "active time" of the terminal device.

The foregoing describes the three implementations in which the terminal device detects the first signal. In specific application, an implementation to be selected may be specified in a protocol, configured by the network device, or the like.

In the embodiments of this application, both the first signal and the second signal may be generated based on a sequence. The first signal may be generated based on a first sequence, the second signal may be generated based on a second sequence, the first sequence belongs to a first sequence set, the second sequence belongs to a second sequence set, and the first sequence set may be a subset of the second sequence set. For example, the first sequence set includes a sequence 1, and the second sequence set includes the sequence 1 and a sequence 2.

Alternatively, the sequence in the embodiments of this application refers to information before modulation. In this case, the first sequence and the second sequence may be a same sequence. For example, both the first sequence and the second sequence are the sequence 1. However, a first modulation scheme may be used when the first signal is generated based on the first sequence, and a second modulation scheme may be used when the second signal is generated based on the first sequence. The first modulation scheme is different from the second modulation scheme, that is, different signals are generated based on a same sequence in different modulation schemes. In this manner, a required sequence can be saved.

Alternatively, because the terminal device monitors the first signal and the second signal on different occasions, the terminal device monitors the first signal only on the n transmission occasions, and monitors the second signal only in the timing duration of the first timer. Therefore, the first sequence and the second sequence may be a same sequence, and a modulation scheme used when a corresponding signal is generated is not limited. For example, the first modulation scheme may be used when the first signal is generated based on the first sequence, and the first modulation scheme may also be used when the second signal is generated based on the first sequence. Because the terminal device monitors the first signal and the second signal respectively on different occasions, parsing of the terminal device is not affected, even if the first signal and the second signal are the same. It may also be understood as that a same sequence may correspond to different signals, and the different signals have different functions. For example, when the sequence corresponds to the first signal, after receiving the first signal, the terminal device may monitor the downlink control channel and/or the second signal in the first time period; or when the sequence corresponds to the second signal, the terminal device may monitor the downlink control channel after receiving the second signal, may enter the "sleep" state in the third time period, or the like. For example, the first signal is generated based on the sequence 1, the second signal is generated based on the sequence 1, and a same modulation scheme is used. In this case, when the sequence 1 corresponds to the first signal, the terminal device may monitor the downlink control channel and/or the second signal in the first time period after receiving the first signal; or when the sequence 1 corresponds to the second signal, the terminal device may monitor the downlink control channel after receiving the second signal, may enter the sleep state in the third time period, or the like.

Alternatively, the first signal and the second signal may not be generated based on a sequence. For example, both the first signal and the second signal are in a form of signaling, to be specific, a bit in an information field is transmitted after channel coding is performed on the bit. For example, the first signal carries a first status value, the second signal carries a second status value, the first status value belongs to a first status value set, the second information status value belongs to a second status value set, and the first status value set is a subset of the second status value set. For example, the first status value carried in the first signal is 2 bits, the second status value carried in the second signal is also 2 bits, the first status value set is [00], and the second status value set is [00, 01, 10, 11]. It can be learned that the first status value set is a subset of the second status value set. For example, the first status value is 00, and the second status value is also 00. In this case, the terminal device may monitor the downlink control channel and/or the second signal in the first time period after receiving the first status value 00; may monitor the downlink control channel after receiving the second status value 00, may enter the sleep state in the third time period; or the like. Alternatively, the first status value is 00, and the second status value is 01. In this case, the terminal device may monitor the downlink control channel and/or the second signal in the first time period after receiving the first status value 00; may monitor the downlink control channel after receiving the second status value 01; may enter the sleep state in the third time period; or the like. In this manner, the first signal and the second signal may be designed in a uniform manner, that is, designed in a same form of channel or signal, to reduce standardization difficulty.

In an implementation, in the embodiments of this application, neither the first signal nor the second signal is bound to a DRX cycle. In other words, even if no DRX mechanism is configured for the UE, to monitor the first signal and/or the second signal may be configured for the UE. In other words, both the first signal and the second signal are unrelated to the DRX cycle and the DRX mechanism. This helps improve scheduling flexibility of the network device, and the terminal device can implement energy saving without a need to wait for the DRX cycle to arrive. In this way, an energy saving effect of the terminal device is improved.

Alternatively, in an implementation, the first signal may be combined with the DRX mechanism. In this case, in this embodiment of this application, the time start location of the first time period may be a time start location of a DRX cycle, and the periodicity in which the terminal device monitors the first signal may directly be a DRX cycle. In this case, timing duration of an on duration timer of the DRX cycle is 0 ms, and in an active time of the DRX cycle, the terminal device starts only the first timer at the start location of the DRX cycle. In this case, it is considered that no inactivity timer exists. Alternatively, in this case, in an active time of the DRX cycle, the terminal device starts only the first timer at the start location of the DRX cycle. In this case, it is considered that neither an on duration timer nor an inactivity timer exists. Alternatively, the first timer may be an inactivity timer. The inactivity timer is started at the start location of the DRX cycle, or the inactivity timer is started provided that the terminal device detects the first signal. In this case, no on duration timer exists, or timing duration of an on duration timer is 0 ms. A running time of the first timer may be the active time of the DRX cycle.

Alternatively, it may be understood as that after detecting the first signal, the terminal device may start a DRX cycle. In this case, the time start location of the first time period is a time start location of the DRX cycle. In a current DRX cycle, the terminal device starts an on duration timer after entering a DRX cycle. If the terminal device detects a PDCCH in timing duration of the on duration timer, the terminal device further starts an inactivity timer in the DRX mechanism, to monitor the PDCCH in timing duration of the inactivity timer. However, in this embodiment of this application, timing for the first time period is performed by using the first timer. In other words, the terminal device only needs to start one timer at the time start location of the first time period. In a subsequent process, the first timer may be reset based on the second signal, but another timer does not need to be started. It may be understood as that the first timer in this embodiment of this application is neither the on duration timer in the current DRX cycle nor the inactivity timer, but is a timer that replaces the on duration timer and the inactivity timer in the original DRX cycle. In this way, a quantity of timers is reduced, and an energy saving process of the terminal device is also simplified.

The following describes, with reference to the accompanying drawings, apparatuses configured to implement the foregoing methods in the embodiments of this application. Therefore, all the foregoing content may be used in the following embodiments, and repeated content is not described again.

Figure 14:
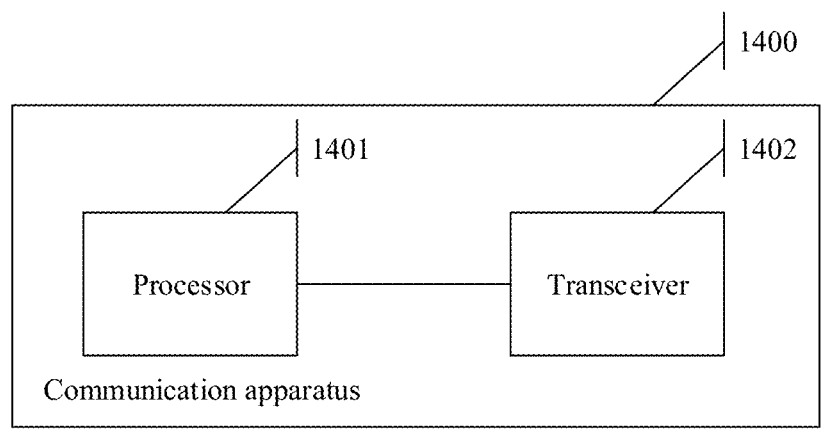
FIG. 14 is a schematic diagram of a communication apparatus that can implement a function of a terminal device according to an embodiment of this application.

FIG. 14 is a schematic structural diagram of a communication apparatus 1400. The communication apparatus 1400 may implement functions of the terminal device described above. The communication apparatus 1400 may be the terminal device described above, or may be a chip disposed in the terminal device described above. The communication apparatus 1400 may include a processor 1401 and a transceiver 1402. The processor 1401 may be configured to perform S101 and S102 in the embodiment shown in FIG. 10 and/or another process used to support the technology described in this specification. For example, the processor 1401 may perform all or some of the processes, other than the receiving and sending processes, performed by the terminal device described above. The transceiver 1402 may be configured to perform S103 and S104 in the embodiment shown in FIG. 10 and/or another process used to support the technology described in this specification, for example, may perform all or some of the foregoing receiving and sending processes performed by the terminal device.

For example, the processor 1401 is configured to monitor a first signal on n transmission occasions in a monitoring periodicity, where n is a positive integer.

The processor 1401 is further configured to: when the processor 1401 detects the first signal on at least one of the n transmission occasions, monitor a downlink control channel and/or a second signal in a first time period in the monitoring periodicity. Alternatively, when the processor 1401 does not detect the first signal on then transmission occasions, the processor 1401 skips monitoring a downlink control channel in the monitoring periodicity.

In a possible implementation, timing for the first time period is performed by using a first timer, and timing duration of the first timer is a length of the first time period.

In a possible implementation, if the processor 1401 monitors the downlink control channel and the second signal in the first time period in the monitoring periodicity, the processor 1401 is further configured to:

when the processor 1401 detects the second signal in the timing duration of the first timer, reset, by the processor 1401, the first timer, and monitor the downlink control channel in timing duration of the reset first timer; or when the processor 1401 detects the second signal in the timing duration of the first timer and the second signal indicates to continue monitoring the downlink control channel, reset, by the processor 1401, the first timer, and monitor the downlink control channel in timing duration of the reset first timer.

In a possible implementation, if the processor 1401 monitors the downlink control channel and the second signal in the first time period in the monitoring periodicity, the processor 1401 is further configured to: when the processor 1401 has not detected the second signal in the timing duration of the first timer, monitor the downlink control channel.

In a possible implementation, if the processor 1401 monitors the second signal in the first time period in the monitoring periodicity, the processor 1401 is further configured to: when the processor 1401 detects the second signal in the timing duration of the first timer, reset, by the processor 1401, the first timer, and monitor the downlink control channel in timing duration of the reset first timer; or when the processor 1401 detects the second signal in the timing duration of the first timer and the second signal indicates to monitor the downlink control channel, reset, by the processor 1401, the first timer, and monitor the downlink control channel in timing duration of the reset first timer.

In a possible implementation, if the processor 1401 monitors the second signal in the first time period in the monitoring periodicity, the processor 1401 is further configured to: when the processor 1401 has not detected the second signal in the timing duration of the first timer, skip monitoring the downlink control channel.

In a possible implementation, the processor 1401 is further configured to: when the processor 1401 detects the second signal in the timing duration of the first timer and the second signal indicates to suspend monitoring the downlink control channel, suspend, by the processor 1401, monitoring the downlink control channel in a third time period.

In a possible implementation, the processor 1401 is further configured to: when the processor 1401 detects the second signal in the timing duration of the first timer and the second signal indicates to suspend monitoring the downlink control channel, keep the first timer running.

In a possible implementation, the processor 1401 is further configured to: when the first timer expires, stop, by the processor 1401, monitoring the downlink control channel and the second signal.

In a possible implementation, when the first timer runs, the processor 1401 skips monitoring the first signal.

In a possible implementation, the processor 1401 periodically monitors the second signal in the timing duration of the first timer.

In a possible implementation, the first signal is used to indicate duration of the first time period.

In a possible implementation, the n transmission occasions are n consecutive transmission occasions.

In a possible implementation, the first signal is generated based on a first sequence, the second signal is generated based on a second sequence, the first sequence belongs to a first sequence set, the second sequence belongs to a second sequence set, and the first sequence set is a subset of the second sequence set; or the first signal carries a first status value, the second signal carries a second status value, the first status value belongs to a first status value set, the second information status value belongs to a second status value set, and the first status value set is a subset of the second status value set.

In a possible implementation, the monitoring periodicity is a DRX cycle, the start location of the first time period is a start location of a DRX cycle, and the communication apparatus 1400 starts only the first timer in the first time period.

All related content of the steps in the foregoing method embodiments may be cited in function descriptions of corresponding functional modules, and details are not described herein again.

Figure 15:
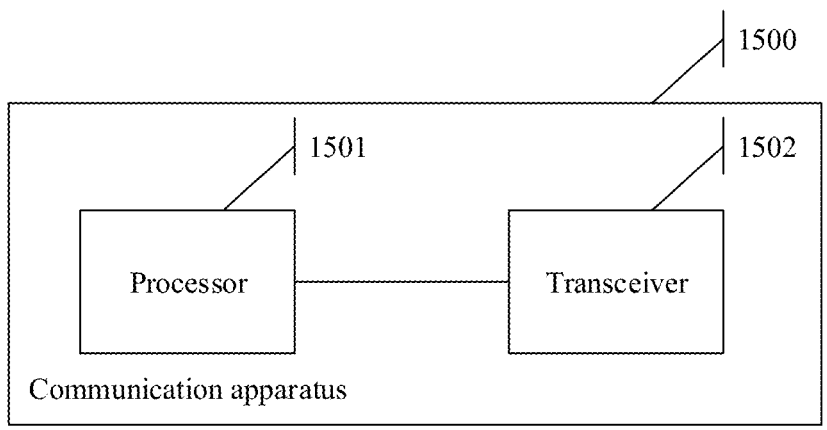
FIG. 15 is a schematic diagram of a communication apparatus that can implement a function of a network device according to an embodiment of this application.

FIG. 15 is a schematic structural diagram of a communication apparatus 1500. The communication apparatus 1500 may implement a function of the second terminal device described above. The communication apparatus 1500 may be the network device described above, or may be a chip disposed in the network device described above. The communication apparatus 1500 may include a processor 1501 and a transceiver 1502. The processor 1501 may be configured to perform all or some operations, other than receiving and sending operations, performed by the network device in the embodiment shown in FIG. 10, for example, a step of determining, by the network device, to perform data scheduling on the terminal device in a monitoring periodicity, and a step of starting or restarting the first timer, and/or configured to support another process of the technology described in this specification, for example, may perform all processes, other than sending and receiving processes, performed by the network device described above. The transceiver 1502 may be configured to perform S103 and S104 in the embodiment shown in FIG. 10 and/or another process used to support the technology described in this specification, for example, may perform all or some of the foregoing receiving and sending processes performed by the network device.

For example, the processor 1501 is configured to determine to perform data scheduling on a terminal device in a monitoring periodicity; and the transceiver 1502 is configured to send a first signal on n transmission occasions in the monitoring periodicity, where the first signal is used to indicate data scheduling, and n is a positive integer.

In a possible implementation, the transceiver 1502 is further configured to send a downlink control channel and/or a second signal in a first time period in the monitoring periodicity.

In a possible implementation, timing for the first time period is performed by using a first timer, and timing duration of the first timer is a length of the first time period.

In a possible implementation, if the transceiver 1502 sends the downlink control channel and the second signal in the first time period in the monitoring periodicity, the processor 1501 is further configured to: when the transceiver 1502 sends the second signal in the timing duration of the first timer, reset, by the processor 1501, the first timer, and send the downlink control channel in timing duration of the reset first timer through the transceiver 1502; or when the transceiver 1502 sends the second signal in the timing duration of the first timer and the second signal indicates to continue monitoring the downlink control channel, reset, by the processor 1501, the first timer, and send the downlink control channel in timing duration of the reset first timer through the transceiver 1502.

In a possible implementation, if the transceiver 1502 sends the downlink control channel and the second signal in the first time period in the monitoring periodicity, the transceiver 1502 is further configured to: when the transceiver 1502 has not sent the second signal in the timing duration of the first timer, send the downlink control channel.

In a possible implementation, if the transceiver 1502 sends the second signal in the first time period in the monitoring periodicity, when the transceiver 1502 sends the second signal in the timing duration of the first timer, the processor 1501 resets the first timer, and sends the downlink control channel in timing duration of the reset first timer through the transceiver 1502; or when the transceiver 1502 sends the second signal in the timing duration of the first timer and the second signal indicates to monitor the downlink control channel, the processor 1501 resets the first timer, and sends the downlink control channel in timing duration of the reset first timer through the transceiver 1502.

In a possible implementation, if the transceiver 1502 sends the second signal in the first time period in the monitoring periodicity, the transceiver 1502 is further configured to: when the transceiver 1502 has not sent the second signal in the timing duration of the first timer, skip sending the downlink control channel.

In a possible implementation, the transceiver 1502 is further configured to: when the transceiver 1502 sends the second signal in the timing duration of the first timer and the second signal indicates to suspend monitoring the downlink control channel, suspend sending the downlink control channel in a third time period.

In a possible implementation, the processor 1501 is further configured to: when the transceiver 1502 sends the second signal in the timing duration of the first timer and the second signal indicates to suspend monitoring the downlink control channel, keep the first timer running.

In a possible implementation, the transceiver 1502 is further configured to: when the first timer expires, stop sending the downlink control channel and the second signal.

In a possible implementation, when the first timer runs, the transceiver 1502 skips sending the first signal.

In a possible implementation, the transceiver 1502 periodically sends the second signal in the timing duration of the first timer.

In a possible implementation, the first signal is used to indicate duration of the first time period.

In a possible implementation, the n transmission occasions are n consecutive transmission occasions.

In a possible implementation, the first signal is generated based on a first sequence, the second signal is generated based on a second sequence, the first sequence belongs to a first sequence set, the second sequence belongs to a second sequence set, and the first sequence set is a subset of the second sequence set; or the first signal carries a first status value, the second signal carries a second status value, the first status value belongs to a first status value set, the second information status value belongs to a second status value set, and the first status value set is a subset of the second status value set.

In a possible implementation, the monitoring periodicity is a DRX cycle, the start location of the first time period is a start location of a DRX cycle, and the communication apparatus 1500 starts only the first timer in the first time period.

All related content of the steps in the foregoing method embodiments may be cited in function descriptions of corresponding functional modules, and details are not described herein again.

Figure 16A:
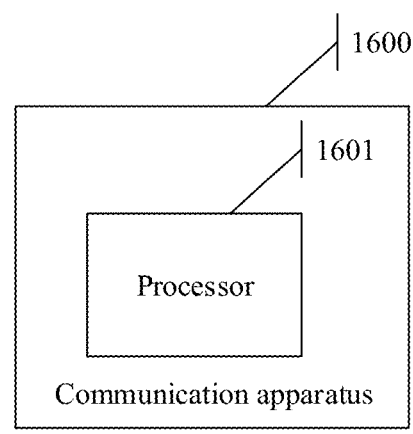
FIG. 16A and FIG. 16B are two schematic diagrams of a communication apparatus according to an embodiment of this application.

In a simple embodiment, a person skilled in the art may figure out that the communication apparatus 1400 or the communication apparatus 1500 may be further implemented by using a structure of the communication apparatus 1600 shown in FIG. 16A. The communication apparatus 1600 may implement a function of the terminal device or the network device described above. The communication apparatus 1600 may include a processor 1601.

When the communication apparatus 1600 is configured to implement a function of the terminal device in the foregoing, the processor 1601 may be configured to perform S101 and S102 in the embodiment shown in FIG. 10 and/or another process used to support the technology described in this specification. For example, the processor 1601 may perform all or some of the processes, other than the receiving and sending processes, performed by the terminal device described above. Alternatively, when the communication apparatus 1600 is configured to implement a function of the network device in the foregoing, the processor 1601 may be configured to perform all or some operations, other than receiving and sending operations, performed by the network device in the embodiment shown in FIG. 10, for example, a step of determining, by the network device, to perform data scheduling on the terminal device in a monitoring periodicity, and a step of starting or restarting the first timer, and/or configured to support another process of the technology described in this specification.

The communication apparatus 1600 may be implemented by using a field-programmable gate array (FPGA), an application-specific integrated chip (ASIC), a system on chip (SoC), a central processing unit (CPU), a network processor (NP), a digital signal processing circuit (DSP), a micro controller unit (MCU), a programmable logic device (PLD), or another integrated chip. The communication apparatus 1600 may be disposed in the terminal device or the network device in the embodiments of this application, so that the terminal device or the network device implements a method provided in the embodiments of this application.

In an optional implementation, the communication apparatus 1600 may include a transceiver component, configured to communicate with another device. When the communication apparatus 1600 is configured to implement a function of the terminal device or the network device described above, the transceiver component may be configured to perform S103 and S104 in the embodiment shown in FIG. 10 and/or another process used to support the technology described in this specification. For example, the transceiver component is a communication interface. If the communication apparatus 1600 is a terminal device or a network device, the communication interface may be a transceiver in the terminal device or network device, for example, the transceiver 1402 or the transceiver 1502. The transceiver is, for example, a radio frequency transceiver component in the terminal device or network device. Alternatively, if the communication apparatus 1600 is a chip disposed in a terminal device or network device, the communication interface may be an input/output interface of the chip, for example, an input/output pin.

Figure 16B:
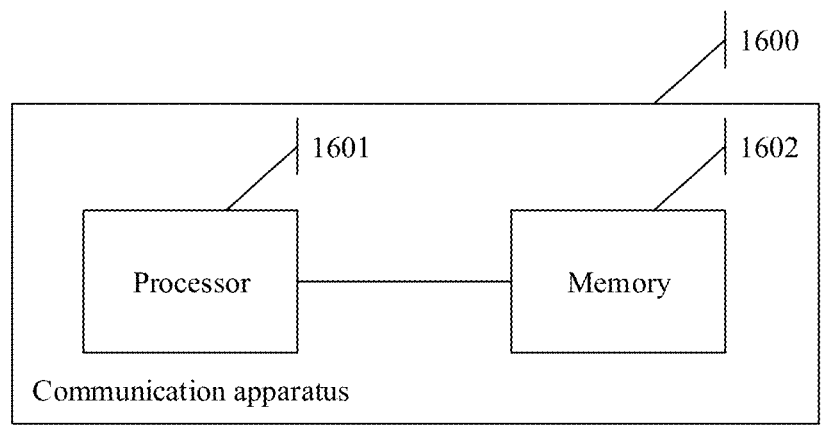

In an optional implementation, the communication apparatus 1600 may further include a memory 1602. Referring to FIG. 16B, the memory 1602 is configured to store computer programs or instructions, and the processor 1601 is configured to decode and execute the computer programs or the instructions. It should be understood that these computer programs or instructions may include functional programs of the terminal device or the network device. When functional programs of the terminal device are decoded and executed by the processor 1601, the terminal device can implement the functions of the terminal device in the method provided in the embodiment shown in FIG. 10 in the embodiments of this application. When functional programs of the network device are decoded and executed by the processor 1601, the network device can implement the functions of the network device in the method provided in the embodiment shown in FIG. 10 in the embodiments of this application.

In another optional implementation, these functional programs of the terminal device or the network device are stored in a memory outside the communication apparatus 1600. When the functional programs of the terminal device are decoded and executed by the processor 1601, the memory 1602 temporarily stores some or all content of the functional programs of the terminal device. When the functional programs of the network device are decoded and executed by the processor 1601, the memory 1602 temporarily stores some or all content of the functional programs of the network device.

In another optional implementation, these functional programs of the terminal device or the network device are set to be stored in the memory 1602 inside the communication apparatus 1600. When the functional programs of the terminal device are stored in the memory 1602 inside the communication apparatus 1600, the communication apparatus 1600 may be disposed in the terminal device in the embodiments of this application. When the functional programs of the network device are stored in the memory 1602 inside the communication apparatus 1600, the communication apparatus 1600 may be disposed in the network device in the embodiments of this application.

In still another optional implementation, some content of the functional programs of the terminal device is stored in a memory outside the communication apparatus 1600, and some other content of the functional programs of the terminal device is stored in the memory 1602 inside the communication apparatus 1600. Alternatively, some content of these functional programs of the network device is stored in a memory outside the communication apparatus 1600, and some other content of these functional programs of the network device is stored in the memory 1602 inside the communication apparatus 1600.

In the embodiments of this application, the communication apparatus 1400, the communication apparatus 1500, and the communication apparatus 1600 are presented in a form in which each functional module is obtained through division based on each corresponding function, or may be presented in a form in which each functional module is obtained through division in an integrated manner. The "module" herein may be an ASIC, a processor and a memory that execute one or more software or firmware programs, an integrated logic circuit, and/or another component that can provide the foregoing functions.

In addition, the communication apparatus 1400 provided in the embodiment shown in FIG. 14 may alternatively be implemented in another form. For example, the communication apparatus includes a processing module and a transceiver module. For example, the processing module may be implemented by using the processor 1401, and the transceiver module may be implemented by using the transceiver 1402. The processing module may be configured to perform S101 and S102 in the embodiment shown in FIG. 10 and/or another process used to support the technology described in this specification. For example, the processing module may perform all or some of the processes, other than the receiving and sending processes, performed by the terminal device described above. The transceiver module may be configured to perform S103 and S104 in the embodiment shown in FIG. 10 and/or another process used to support the technology described in this specification, for example, may perform all or some of the foregoing receiving and sending processes performed by the terminal device. The transceiver module may include a transceiver component that communicates with a network device, and may further include a transceiver component that communicates with another terminal device.

For example, the processing module is configured to monitor a first signal on n transmission occasions in a monitoring periodicity, where n is a positive integer.

The processing module is further configured to: when the processing module detects the first signal on at least one of the n transmission occasions, monitor a downlink control channel and/or a second signal in a first time period in the monitoring periodicity. Alternatively, when the processing module does not detect the first signal on the n transmission occasions, the processing module skips monitoring a downlink control channel in the monitoring periodicity.

In a possible implementation, timing for the first time period is performed by using a first timer, and timing duration of the first timer is a length of the first time period.

In a possible implementation, if the processing module monitors the downlink control channel and the second signal in the first time period in the monitoring periodicity, the processing module is further configured to: when the processing module detects the second signal in the timing duration of the first timer, reset, by the processing module, the first timer, and monitor the downlink control channel in timing duration of the reset first timer; or when the processing module detects the second signal in the timing duration of the first timer and the second signal indicates to continue monitoring the downlink control channel, reset, by the processing module, the first timer, and monitor the downlink control channel in timing duration of the reset first timer.

In a possible implementation, if the processing module monitors the downlink control channel and the second signal in the first time period in the monitoring periodicity, the processing module is further configured to: when the processing module has not detected the second signal in the timing duration of the first timer, monitor the downlink control channel.

In a possible implementation, if the processing module monitors the second signal in the first time period in the monitoring periodicity, the processing module is further configured to: when the processing module detects the second signal in the timing duration of the first timer, reset, by the processing module, the first timer, and monitor the downlink control channel in timing duration of the reset first timer; or when the processing module detects the second signal in the timing duration of the first timer and the second signal indicates to monitor the downlink control channel, reset, by the processing module, the first timer, and monitor the downlink control channel in timing duration of the reset first timer.

In a possible implementation, if the processing module monitors the second signal in the first time period in the monitoring periodicity, the processing module is further configured to: when the processing module has not detected the second signal in the timing duration of the first timer, skip monitoring the downlink control channel.

In a possible implementation, the processing module is further configured to: when the processing module detects the second signal in the timing duration of the first timer and the second signal indicates to suspend monitoring the downlink control channel, suspend, by the processor 1401, monitoring the downlink control channel in a third time period.

In a possible implementation, the processing module is further configured to: when the processing module detects the second signal in the timing duration of the first timer and the second signal indicates to suspend monitoring the downlink control channel, keep the first timer running.

In a possible implementation, the processing module is further configured to: when the first timer expires, stop, by the processing module, monitoring the downlink control channel and the second signal.

In a possible implementation, when the first timer runs, the processing module skips monitoring the first signal.

In a possible implementation, the processing module periodically monitors the second signal in the timing duration of the first timer.

In a possible implementation, the first signal is used to indicate duration of the first time period.

In a possible implementation, the n transmission occasions are n consecutive transmission occasions.

In a possible implementation, the first signal is generated based on a first sequence, the second signal is generated based on a second sequence, the first sequence belongs to a first sequence set, the second sequence belongs to a second sequence set, and the first sequence set is a subset of the second sequence set; or the first signal carries a first status value, the second signal carries a second status value, the first status value belongs to a first status value set, the second information status value belongs to a second status value set, and the first status value set is a subset of the second status value set.

In a possible implementation, the monitoring periodicity is a DRX cycle, the start location of the first time period is a start location of a DRX cycle, and the communication apparatus starts only the first timer in the first time period.

All related content of the steps in the foregoing method embodiments may be cited in function descriptions of corresponding functional modules, and details are not described herein again.

The communication apparatus 1500 provided in the embodiment shown in FIG. 15 may alternatively be implemented in another form. For example, the communication apparatus includes a processing module and a transceiver module. For example, the processing module may be implemented by using the processor 1501, and the transceiver module may be implemented by using the transceiver 1502. The processing module may be configured to perform all or some operations, other than receiving and sending operations, performed by the network device in the embodiment shown in FIG. 10, for example, a step of determining, by the network device, to perform data scheduling on the terminal device in a monitoring periodicity, and a step of starting or restarting the first timer, and/or configured to support another process of the technology described in this specification, for example, may perform all processes, other than sending and receiving processes, performed by the network device described above. The transceiver module may be configured to perform S103 and S104 in the embodiment shown in FIG. 10 and/or another process used to support the technology described in this specification, for example, may perform all or some of the foregoing receiving and sending processes performed by the network device.

For example, the processing module is configured to determine to perform data scheduling on a terminal device in a monitoring periodicity; and the transceiver module is configured to send a first signal on n transmission occasions in the monitoring periodicity, where the first signal is used to indicate data scheduling, and n is a positive integer.

In a possible implementation, the transceiver module is further configured to send a downlink control channel and/or a second signal in a first time period in the monitoring periodicity.

In a possible implementation, timing for the first time period is performed by using a first timer, and timing duration of the first timer is a length of the first time period.

In a possible implementation, if the transceiver module sends the downlink control channel and the second signal in the first time period in the monitoring periodicity, the processing module is further configured to: when the transceiver module sends the second signal in the timing duration of the first timer, reset, by the processing module, the first timer, and send the downlink control channel in timing duration of the reset first timer through the transceiver module; or when the transceiver module sends the second signal in the timing duration of the first timer and the second signal indicates to continue monitoring the downlink control channel, reset, by the processing module, the first timer, and send the downlink control channel in timing duration of the reset first timer through the transceiver module.

In a possible implementation, if the transceiver module sends the downlink control channel and the second signal in the first time period in the monitoring periodicity, the transceiver module is further configured to: when the transceiver module has not sent the second signal in the timing duration of the first timer, send the downlink control channel.

In a possible implementation, if the transceiver module sends the second signal in the first time period in the monitoring periodicity, when the transceiver module sends the second signal in the timing duration of the first timer, the processing module resets the first timer, and sends the downlink control channel in timing duration of the reset first timer through the transceiver module; or when the transceiver module sends the second signal in the timing duration of the first timer and the second signal indicates to monitor the downlink control channel, the processing module resets the first timer, and sends the downlink control channel in timing duration of the reset first timer through the transceiver module.

In a possible implementation, if the transceiver module sends the second signal in the first time period in the monitoring periodicity, the transceiver module is further configured to: when the transceiver module has not sent the second signal in the timing duration of the first timer, skip sending the downlink control channel.

In a possible implementation, the transceiver module is further configured to: when the transceiver module sends the second signal in the timing duration of the first timer and the second signal indicates to suspend monitoring the downlink control channel, suspend sending the downlink control channel in a third time period.

In a possible implementation, the processing module is further configured to: when the transceiver module sends the second signal in the timing duration of the first timer and the second signal indicates to suspend monitoring the downlink control channel, keep the first timer running.

In a possible implementation, the transceiver module is further configured to: when the first timer expires, stop sending the downlink control channel and the second signal.

In a possible implementation, when the first timer runs, the transceiver module skips sending the first signal.

In a possible implementation, the transceiver module periodically sends the second signal in the timing duration of the first timer.

In a possible implementation, the first signal is used to indicate duration of the first time period.

In a possible implementation, the n transmission occasions are n consecutive transmission occasions.

In a possible implementation, the first signal is generated based on a first sequence, the second signal is generated based on a second sequence, the first sequence belongs to a first sequence set, the second sequence belongs to a second sequence set, and the first sequence set is a subset of the second sequence set; or the first signal carries a first status value, the second signal carries a second status value, the first status value belongs to a first status value set, the second information status value belongs to a second status value set, and the first status value set is a subset of the second status value set.

In a possible implementation, the monitoring periodicity is a DRX cycle, the start location of the first time period is a start location of a DRX cycle, and the communication apparatus starts only the first timer in the first time period.

All related content of the steps in the foregoing method embodiments may be cited in function descriptions of corresponding functional modules, and details are not described herein again.

The communication apparatus 1400, the communication apparatus 1500, and the communication apparatus 1600 provided in the embodiments of this application may be configured to perform the method provided in the embodiment shown in FIG. 10. Therefore, for technical effects that can be achieved by the communication apparatuses, refer to the foregoing method embodiments. Details are not described herein again.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a special-purpose computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (e.g., a coaxial cable, an optical fiber, or a digital subscriber line (DSL)) or wireless (e.g., infrared, radio, or microwave) manner. The computer-readable storage medium may be any usable medium accessible by a computer, or a data storage device, such as a server or a data center, including one or more usable mediums that are integrated. The usable medium may be a magnetic medium (e.g., a floppy disk, a hard disk, or a magnetic tape), an optical medium (e.g., a digital versatile disc (DVD)), a semiconductor medium (e.g., a solid-state drive (SSD)), or the like.

It is clear that a person skilled in the art can make various modifications and variations to the embodiments of this application without departing from the spirit and scope of this application. This application is intended to cover these modifications and variations of the embodiments of this application provided that they fall within the scope of the claims of this application and their equivalent technologies.

What is claimed is:

1. A channel monitoring method carried out by a terminal device, comprising:
    monitoring a first signal on n transmission occasions in a monitoring periodicity, wherein n is a positive integer; and
    monitoring, in accordance with detecting the first signal during at least one of the n transmission occasions, a downlink control channel and/or a second signal in a first time period in the monitoring periodicity,
    wherein timing for the first time period is performed by using a first timer, and timing duration of the first timer is a length of the first time period, and
    wherein the method further comprises:
        resetting, in accordance with detecting the second signal during monitoring the downlink control signal, the first timer and monitoring the downlink control channel in a timing duration of the reset first timer; or
        resetting, in accordance with detecting the second signal in the timing duration of the first timer and the second signal indicates to continue monitoring the downlink control channel, the first timer and monitoring the downlink control channel in a timing duration of the first timer after the resetting the first timer.

2. The method according to claim 1, wherein the method further comprises:
    monitoring, in accordance with not detecting the second signal during monitoring the second signal in the timing duration of the first timer, the downlink control channel.

3. The method according to claim 1, further comprising:
    resetting, in accordance with detecting the second signal in the timing duration of the first timer, the first timer and monitoring the downlink control channel in timing duration of the reset first timer; or
    resetting, in accordance with detecting the second signal in the timing duration of the first timer and the second signal indicates to monitor the downlink control channel, the first timer and monitoring the downlink control channel in timing duration of the reset first timer.

4. A channel monitoring method carried out by a network device, the method comprising:
    determining to perform data scheduling on a terminal device in a monitoring periodicity;
    sending a first signal on n transmission occasions in the monitoring periodicity; and
    sending a downlink control channel and/or sending a second signal in a first time period in the monitoring periodicity,
    wherein the first signal is used to indicate data scheduling, wherein n is a positive integer, wherein timing for the first time period is performed by using a first timer, and timing duration of the first timer is a length of the first time period, and wherein the method further comprises:

resetting, in accordance with sending the second signal in the timing duration of the first timer, the first timer and sending the downlink control channel in timing duration of the reset first timer; or resetting, in accordance with sending the second signal in the timing duration of the first timer and the second signal indicates to continue monitoring the downlink control channel, the first timer and sending the downlink control channel in timing duration of the reset first timer.

5. The method according to claim 4, further comprising:

sending, in accordance with not sending the second signal in the timing duration of the first timer, the downlink control channel.

6. A terminal device, comprising:

a processor, and a non-transient computer readable medium including computer-executable instructions that, when executed by the processor, facilitate carrying out a method including:

monitoring a first signal on n transmission occasions in a monitoring periodicity, wherein n is a positive integer; and monitoring, in accordance with detecting the first signal during at least one of the n transmission occasions, a downlink control channel and/or a second signal in a first time period in the monitoring periodicity, wherein timing for the first time period is performed by using a first timer, and timing duration of the first timer is a length of the first time period, and wherein the method further comprises:

resetting, in accordance with detecting the second signal during monitoring the downlink control signal, the first timer and monitoring the downlink control channel in a timing duration of the reset first timer; or resetting, in accordance with detecting the second signal in the time duration of the first timer and the second signal indicates to continue monitoring the downlink control channel, the first timer and monitoring the downlink control channel in a timing duration of the first timer after resetting the first timer.

7. The terminal device according to claim 6, wherein the method further comprises:

monitoring, in accordance with not detecting the second signal during monitoring the second signal in the timing duration of the first timer, the downlink control channel.

8. The terminal device according to claim 6, wherein the method further comprises:

resetting, in accordance with detecting the second signal in the timing duration of the first timer, the first timer and monitoring the downlink control channel in timing duration of the reset first timer; or resetting, in accordance with detecting the second signal in the timing duration of the first timer and the second signal indicates to monitor the downlink control channel, the first timer and monitoring the downlink control channel in timing duration of the reset first timer.

9. A network device, comprising:

a processor, and a non-transient computer readable medium including computer-executable instructions that, when executed by the processor, facilitate carrying out a method including:

determining to perform data scheduling on a terminal device in a monitoring periodicity;

sending a first signal on n transmission occasions in the monitoring periodicity; and sending a downlink control channel and/or sending a second signal in a first time period in the monitoring periodicity, wherein the first signal is used to indicate data scheduling, wherein n is a positive integer, wherein timing for the first time period is performed by using a first timer, and timing duration of the first timer is a length of the first time period, and wherein the method further comprises:

resetting, in accordance with sending the second signal in the timing duration of the first timer, the first timer and sending the downlink control channel in timing duration of the reset first timer; or resetting, in accordance with sending the second signal in the timing duration of the first timer and the second signal indicates to continue monitoring the downlink control channel, the first timer and sending the downlink control channel in timing duration of the reset first timer.

10. The network device according to claim 9, wherein the method further comprises:

sending, in accordance with not sending the second signal in the timing duration of the first timer, the downlink control channel.

* * * * *